United States Patent
Sakai et al.

(10) Patent No.: US 9,751,046 B2
(45) Date of Patent: Sep. 5, 2017

(54) SALT WATER DESALINATION EQUIPMENT

(71) Applicant: KYOWAKIDEN INDUSTRY CO., LTD., Nagasaki (JP)

(72) Inventors: Hideyuki Sakai, Nagasaki (JP); Morihiro Irie, Nagasaki (JP); Akihiko Tanioka, Tokyo (JP)

(73) Assignee: KYOWAKIDEN INDUSTRY CO., LTD., Nagasaki (JP)

( * ) Notice: Subject to any disclaimer, the term of this patent is extended or adjusted under 35 U.S.C. 154(b) by 50 days.

(21) Appl. No.: 14/760,087

(22) PCT Filed: Jan. 29, 2014

(86) PCT No.: PCT/JP2014/051873
§ 371 (c)(1),
(2) Date: Jul. 9, 2015

(87) PCT Pub. No.: WO2014/162763
PCT Pub. Date: Oct. 9, 2014

(65) Prior Publication Data
US 2015/0352497 A1    Dec. 10, 2015

(30) Foreign Application Priority Data

Apr. 2, 2013   (JP) ................. 2013-076514

(51) Int. Cl.
*B01D 61/06*       (2006.01)
*B01D 61/58*       (2006.01)
(Continued)

(52) U.S. Cl.
CPC ............ *B01D 61/10* (2013.01); *B01D 61/58* (2013.01); *C02F 1/441* (2013.01); *C02F 1/445* (2013.01);
(Continued)

(58) Field of Classification Search
None
See application file for complete search history.

(56) References Cited

U.S. PATENT DOCUMENTS

2013/0037479 A1    2/2013  Hayashi et al.
2013/0160435 A1*   6/2013  Ordonez Fernandez
                                       ............................ B01D 61/002
                                                                              60/327

FOREIGN PATENT DOCUMENTS

JP        01-123605        5/1989
JP        2000-167358      6/2000
(Continued)

OTHER PUBLICATIONS

International Search Report in PCT/JP2014/051873, dated Mar. 4, 2014.

*Primary Examiner* — Krishnan S Menon
(74) *Attorney, Agent, or Firm* — Greenblum & Bernstein, P.L.C.

(57) ABSTRACT

A salt water desalination equipment that can reduce a load on a salt water supply pump and a power consumption thereof is provided. A salt water desalination equipment includes a salt water supply unit that supplies salt water to a reverse osmosis membrane component, a forward osmosis membrane component to which concentrated salt water discharged from the reverse osmosis membrane component is supplied; and an assisting device to which a mixed water discharged from the forward osmosis membrane component is supplied and which is also connected to the salt water supply unit. The assisting device increases at least one of an electric power supplied to the salt water supply unit, a pressure given to the salt water supply unit, and rotation capacity to the salt water supply unit.

11 Claims, 11 Drawing Sheets

(51) Int. Cl.
  *C02F 1/44* (2006.01)
  *B01D 61/10* (2006.01)
  *B01D 61/00* (2006.01)
  *B01D 61/02* (2006.01)
  *B01D 61/12* (2006.01)
  *C02F 103/08* (2006.01)

(52) U.S. Cl.
  CPC .......... *B01D 61/002* (2013.01); *B01D 61/025* (2013.01); *B01D 61/12* (2013.01); *B01D 2311/04* (2013.01); *B01D 2311/08* (2013.01); *B01D 2313/243* (2013.01); *B01D 2313/246* (2013.01); *B01D 2317/022* (2013.01); *C02F 2103/08* (2013.01); *C02F 2303/10* (2013.01); *Y02W 10/30* (2015.05)

(56) References Cited

FOREIGN PATENT DOCUMENTS

| | | |
|---|---|---|
| JP | 2003-176775 | 6/2003 |
| JP | 2005-279540 | 10/2005 |
| JP | 2011-083741 | 4/2011 |
| JP | 2012-096151 | 5/2012 |
| JP | 2012-192379 | 10/2012 |
| JP | 2012-250200 | 12/2012 |
| WO | 2011/144778 | 11/2011 |
| WO | 2012/002263 | 1/2012 |
| WO | 2013/140848 | 9/2013 |

\* cited by examiner

SALT WATER DESALINATION EQUIPMENT

TECHNICAL FIELD

The present invention relates to a salt water desalination equipment that exchanges salt water into freshwater by using an osmosis membrane and to a salt water desalination equipment which utilizes high-pressure concentrated salt water obtained in desalination to reduce a power consumption of a salt water supply pump which supplies salt water to an osmosis membrane for performing desalination.

BACKGROUND ART

In recent years, in our country, as a matter of course, in all the countries of the world, lack of daily life water (especially drinkable water and water used for food) is posed as a problem. As one of the reasons, the supply of daily life water cannot catch up with an increase in growth of population in the world (mainly developing countries). Furthermore, population flowing from local areas to urban areas is increasing in each of the countries, and, in an urban area which originally has a small number of freshwater supplies such as rivers and lakes, imbalance of supply and demand of daily life water for population occurs. Due to desertification caused by global warming, concentration of heavy rains on specific areas, and the like, freshwater which can be used as daily life water is hard to be pooled. In addition, with raising of environmental awareness, dams have been difficult to be constructed in rivers.

For these reasons, in each of the countries of the world including our country, lack of daily life water becomes a serious problem. The lack of daily life water is an issue which may cause internal conflicts or dispute with neighboring countries sometimes.

In the above circumstances, a salt water desalination equipment that desalinates salt water has been installed in a coast area or the like to obtain freshwater from salt water. Also in our country, salt water desalination equipments installed in a relatively calm inland sea such as a coast or a bay area of an urban area in which lack of water easily occurs have increased in number. The salt water desalination equipment draws salt water from an inland sea and produces freshwater by using components such as a reverse osmosis membrane and a forward osmosis membrane. The produced freshwater is used as daily life water.

Conventional basic techniques about salt water desalination equipments using osmosis membranes have been proposed. The salt water desalination equipments are actually installed in various places. The salt water desalination equipments are practically utilized.

In addition, for a salt water desalination equipment using an osmosis membrane, techniques for improving efficiency of desalination from salt water and flow control for the improvement in efficiency are also proposed (for example, see PTLs 1 and 2). In the salt water desalination equipment, a power consumption in a salt water supply pump for supplying salt water to an osmosis membrane component which desalinates salt water is high. A technique which reduces a load on the salt water supply pump is also proposed (for example, see PTL 3).

In particular, a reduction in power consumption in a salt water desalination equipment has been required in recent years. In terms of the power consumption, especially, a reduction in power consumption in a salt water supply pump is an important problem.

CITATION LIST

Patent Literature

PTL 1: Japanese Patent Application Laid-Open No. 2012-230200
PTL 2: Japanese Patent Application Laid-Open No. 2012-192379
PTL 3: Japanese Patent Application Laid-Open No. 2012-96151

SUMMARY OF INVENTION

Technical Problem

PTL 1 is configured by a first chamber of a forward osmosis membrane processing unit operable to be in contact with a forward osmosis membrane and to which raw water (salt water) is supplied, a second chamber of the forward osmosis membrane processing unit operable to be in contact with the forward osmosis membrane and to which a hypertonic solution for collecting water obtained by transmitting salt water through the membrane is supplied, a refining unit operable to remove dissolved substances or particles in the hypertonic solution, and a pipe which supplies a solution having an osmotic pressure lower than that of the salt water to the second chamber. An osmotic pressure difference between the first chamber and the second chamber is used as drive force to transmit water contained in the second chamber through the forward osmosis membrane.

More specifically, PTL 1 discloses a technique that removes materials adhering to the forward osmosis membrane with salt water supplied to the forward osmosis membrane for desalinating salt water. The adhering materials are removed to make it possible to maintain the desalination capability of the forward osmosis membrane and to improve the durability of a salt water desalination system.

However, the salt water desalination system disclosed in PTL 1 can maintain the capability of the forward osmosis membrane, but does not reduce a load on the salt water supply pump. For this reason, a reduction in power consumption of the salt water desalination system cannot be achieved, and costs of desalination from salt water are high to block the salt water desalination system from being popularized.

PTL 2 discloses a salt water desalination equipment including a high-pressure RO membrane strainer 4 which separates salt water into transmitted water and concentrated water, a high-pressure pump P1, a power recovery device 5, a control valve V5 which controls a flow rate of the concentrated water discharged from the power recovery device, a first flowmeter Q1 which measures a flow rate of the concentrated water, a low-pressure RO membrane strainer 7 which separates high-pressure reverse membrane transmitted water into transmitted water and concentrated water, a low-pressure pump P2, a control valve V6 which controls a flow rate of the concentrated water discharged from the low-pressure RO membrane strainer, a second flowmeter Q2 which measures a flow rate of the concentrated water, a thermometer 21 which measures a water temperature of salt water supplied to the high-pressure RO membrane strainer, an electric conductance meter 22 which measures an electric conductivity of salt water supplied to a high-pressure strainer, and control units 11 and 12 operable to control apertures of the two control valves V5 and V6 on the basis of the measured temperature of the salt water, the electric conductivity, and the two flow rates, respectively.

An object of the flow rate control is to constantly maintain the capability of desalination from salt water which is changed depending on the temperature of salt water.

However, the technique disclosed in PTL 2 does not achieve a reduction in load on the salt water supply pump. For this reason, a reduction in power consumption of the salt water desalination system cannot be achieved, and the costs of desalination from salt water are high to block the salt water desalination system from being popularized.

PTL 3 discloses a salt water desalination system which conducts salt water having a pressure increased with a pump through a reverse osmosis membrane separating device 4 and separates the salt water into freshwater and concentrated salt water to produce freshwater from the salt water, including an energy exchange chamber 20 which uses pressure energy of the concentrated salt water discharged from the reverse osmosis membrane separating device 4 as energy to increase a pressure of a part of the salt water, the energy exchange chamber 20 including a concentrated salt water port P1 which takes in/out the concentrated salt water, a salt water port P2 which takes in/out salt water, and a flow path R which is disposed in the chamber and divided into a plurality of parts to cause the concentrated salt water port P1 and the salt water port P2 to communicate with each other, and the flow path R being divided into the plurality of parts which have equal sectional areas and equal shapes, respectively, and a fluid being prevented from flowing in parts except for the flow path R.

PTL 3 has as its object to improve the input capability of salt water from a salt water P2 by an energy exchange chamber 20 for increasing a pressure of salt water such that pressure energy of concentrated salt water is used for the salt water port P2 corresponding to a salt water supply pump. For this reason, the salt water desalination system disclosed in PTL 3 has as its object to reduce a load on the salt water supply pump.

However, in the salt water desalination system described in PTL 3, when the pressure energy of the concentrated salt water discharged from the reverse osmosis membrane is merely used in the originally included salt water supply pump, assistance exceeding the capability the salt water port has cannot be obtained. For this reason, actually, even though the pressure energy of the concentrated salt water is given to the salt water port with the energy exchange chamber, the salt water supply capacity of the salt water port is not improved, and a power consumption in the salt water port is nor considerably reduced.

In each of PTLs 1 to 3, it is only assumed that desalination is performed with a reverse osmosis membrane to utilize only high-pressure concentrated salt water produced from a reverse osmosis membrane. However, the range of utilization of only the concentrated salt water produced by the reverse osmosis membrane is disadvantageously narrow.

As described above, a conventional salt water desalination equipment cannot efficiently reduce a load on a salt water supply pump for supplying salt water and a power consumption therefor. As a result, the running cost of the salt water desalination equipment increases to prevent the salt water desalination equipment from being popularized. In particular, countries and regions which require salt water desalination equipments include many developing countries, and the high running cost is a bottleneck in installation of the salt water desalination equipments.

The present invention has as its object to provide a salt water desalination equipment which solves the problems and can reduce a load on a salt water supply pump and a power consumption thereof.

Solution to Problems

In consideration of the above problems, a salt water desalination equipment according to the present invention includes a salt water supply unit operable to supply salt water to a reverse osmosis membrane, a forward osmosis membrane component to which concentrated salt water discharged from the reverse osmosis membrane component is supplied, and an assisting device to which mixed water discharged from the forward osmosis membrane component is supplied and which is connected to the salt water supply unit, the assisting device increasing at least one of an electric power supplied to the salt water supply unit, a pressure given to the salt water supply unit, and rotation capacity to the salt water supply unit.

Advantageous Effects of Invention

The salt water desalination equipment according to the present invention can directly or indirectly supply high-pressure concentrated salt water obtained by the reverse osmosis membrane component to the positive osmosis membrane and can use the high-pressure concentrated salt water obtained from the forward osmosis membrane component as a power source of the assisting device for the salt water supply pump.

As a result, the load on the salt water supply pump can be reduced in various aspects, and the capability of the salt water supply pump can be improved. As a result, the load on the salt water supply pump can be reduced, and a power consumption thereof can be reduced.

The power consumption of the salt water supply pump is reduced to reduce the running cost of the salt water desalination equipment and to enhance the popularization of salt water desalination equipments. As a result, in countries and regions suffering from water shortage, daily life water obtained by using salt water can be secured. Furthermore, the securing of daily life water is achieved to make it hard to cause regional conflicts or the like and to make it possible to contribute to regional stabilization.

DESCRIPTION OF EMBODIMENTS

Figure 1:
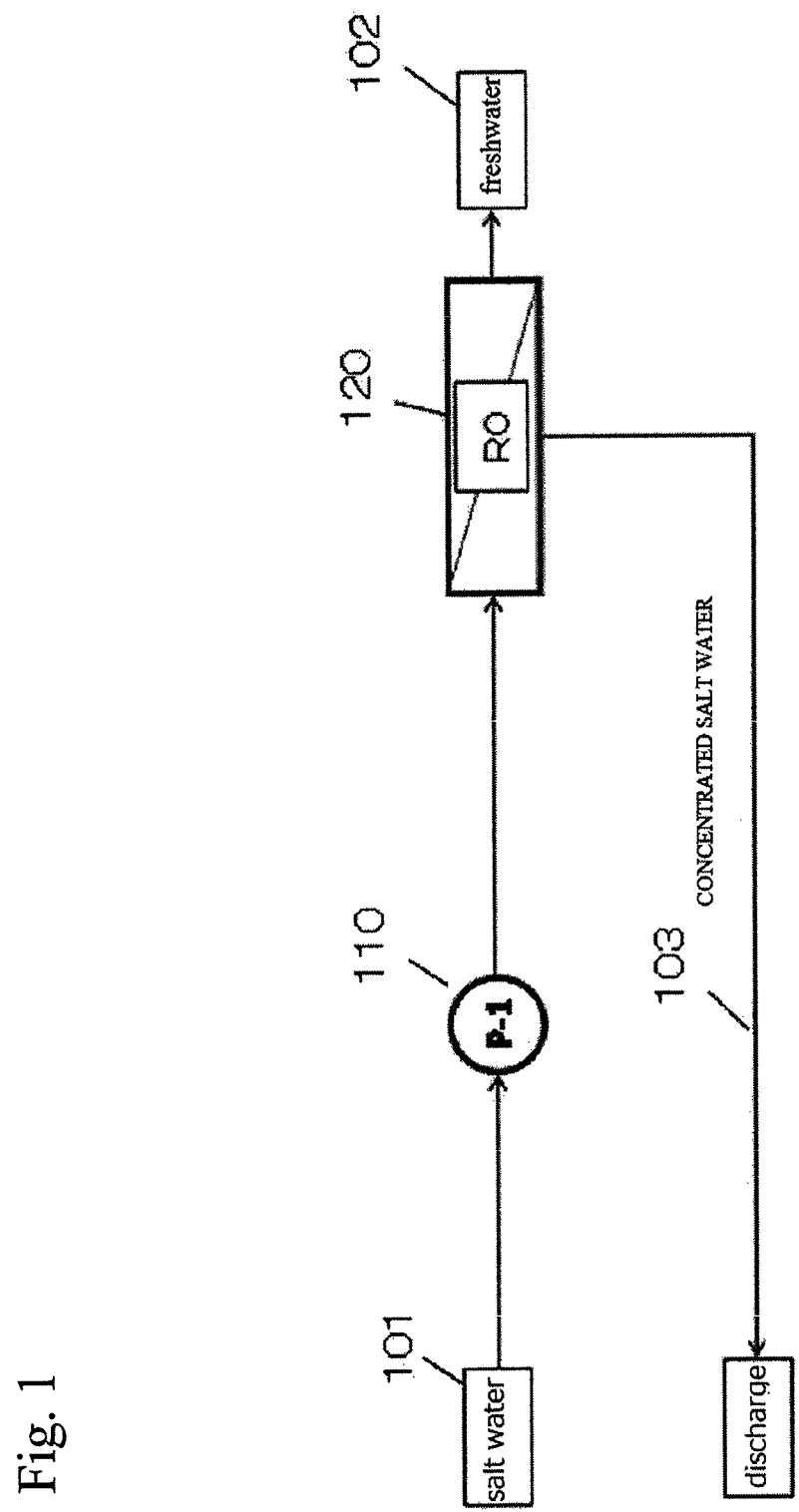
FIG. 1 is a block diagram of a commonly-used salt water desalination equipment using a reverse osmosis membrane.

A salt water desalination equipment according to a first invention of the present invention includes a salt water supply unit operable to supply salt water to a reverse osmosis membrane component, a forward osmosis membrane component to which concentrated salt water discharged from the reverse osmosis membrane component is supplied, and an assisting device to which mixed water discharged from the forward osmosis membrane component is supplied and which is connected to the salt water supply unit. The assisting device increases at least one of an electric power supplied to the salt water supply unit, a pressure given to the salt water supply unit, and rotation capacity to the salt water supply unit.

With the configuration, the concentrated salt water produced by the reverse osmosis membrane is not directly discharged to the surrounding, and an environmental load can be directly reduced. In addition, the concentrated salt water is made into mixed water the water volume of which is increased by the forward osmosis membrane component, so that, by using the increased water volume, a power consumption or an energy consumption required for the salt water supply unit can be reduced. More specifically, energy saving can be achieved, and an environmental load can be indirectly reduced.

In a salt water desalination equipment according to a second invention of the present invention, in addition to the first invention, a salt water supply unit is a salt water supply pump.

With the configuration, the cost of the salt water supply unit can be reduced.

In a salt water desalination equipment according to a third invention of the present invention, in addition to the first and second inventions, a reverse osmosis membrane component has a salt water path to which salt water supplied from the salt water supply unit is fed and through which the salt water passes, and a freshwater path through which freshwater obtained by removing a salt content from the salt water by a reverse osmotic phenomenon on the membrane. Concentrated salt water is discharged from the salt water path, and the fresh water is supplied from the freshwater path.

With this configuration, the reverse osmosis membrane component can produce freshwater while producing concentrated salt water. The salt water desalination equipment utilizes the concentrated salt water in an assisting device while using the freshwater as daily life water or the like to achieve an energy-saving operation.

In a salt water desalination equipment according to a fourth invention of the present invention, in addition to any one of the first to third inventions, a forward osmosis membrane component includes a concentrated salt water path to which concentrated salt water is supplied and through which the concentrated salt water passes and a treated freshwater path to which treated water is supplied and through which the treated water passes. Water molecules are moved from the treated freshwater path to the concentrated salt water path by a forward osmotic phenomenon, and the forward osmosis membrane component produces mixed water to output the mixed water to an assisting device.

With the configuration, the forward osmosis membrane component increase a water volume of the concentrated salt water while maintaining the pressure of the concentrated salt water to make it possible to produce mixed water the energy amount of which is increased. The mixed water operates the assisting device to make it possible to reduce the entire power consumption and the entire energy consumption of the salt water desalination equipment.

In the salt water desalination equipment according to a fifth invention of the present invention, in addition to the fourth embodiment, mixed water has a salt concentration lower than that of concentrated salt concentration.

With the configuration, an environmental load caused by discharged water finally discharged to the surrounding can be reduced.

In a salt water desalination equipment according to a sixth invention of the present invention, in addition to the fourth or fifth invention, mixed water has at least one of a water volume and energy higher than those of concentrated salt water.

With the configuration, the mixed water can operate the assisting device at efficiency higher than that of the assisting device operated with concentrated salt water. As a result, the salt water desalination equipment can be operated at a lower power consumption as a whole.

In a salt water desalination equipment according to a seventh invention of the present invention, in addition to any one of the first to sixth embodiments, when a salt water supply unit is a salt water supply pump which rotates along a rotating shaft to supply salt water, an assisting device has a rotation assisting component which is directly connected to the rotating shaft to increase at least one of the rotating speed and the torque of the salt water supply pump.

With the configuration, the power consumption and the energy consumption of the salt water supply unit can be simply reduced.

In a salt water desalination equipment according to an eighth invention of the present invention, in addition to the seventh invention, a rotation assisting component generates rotating force with the pressure of supplied mixed water to increase at least one of the rotating speed and the torque of a salt water supply pump through a rotating shaft directly connected to the rotation assisting component.

With the configuration, the rotating shaft is directly controlled to make it possible to assist the operation of the salt water supply unit with a small loss.

In a salt water desalination equipment according to a ninth invention of the present invention, in addition to any one of the first to sixth inventions, when a salt water supply unit is a salt water supply pump operated by electric power, an assisting device has an electric power generating unit operable to generate assisting electric power supplied to the salt water supply pump, and the salt water supply pump is operated by also using the assisting electric power.

With the configuration, the power consumption of the salt water supply unit can be reduced.

In a salt water desalination equipment according to a tenth invention of the present invention, in addition to the ninth invention, mixed water rotates a turbine included in an electric power generating unit with pressure of the mixed water.

With the configuration, the mixed water can generate assisting electric power.

In a salt water desalination equipment according to an eleventh invention of the present invention, in addition to any one of the first to sixth inventions, an assisting device has a second pressure exchange unit operable to be connected to a salt water supply unit, the second pressure exchange unit receives mixed water to increase the pressure of salt water input to the salt water supply unit, and the second pressure exchange unit supplies the salt water the pressure of which is increased to a reverse osmosis membrane component.

With the configuration, a load on the salt water supply unit can be reduced.

In a salt water desalination equipment according to a twelfth invention of the present invention, in addition to any one of the first to eleventh inventions, a third pressure exchange unit is disposed on the upstream side of a forward osmosis membrane component, and the third pressure exchange unit increases the pressure of supplied concentrated salt water by using mixed water discharged from the forward osmosis membrane component.

With the configuration, the mixed water is distributed in a balanced manner, and an amount of energy of the mixed water can be increased while the energy consumption of the salt water supply unit is reduced. As a result, the power consumption and the energy consumption of the salt water desalination equipment can be reduced as a whole.

In a salt water desalination equipment according to a thirteenth invention of the present invention, in addition to the twelfth invention, a salt water supply unit operable to supply salt water from a salt water source to a reverse osmosis membrane component is divided into a plurality of pathways to supply the salt water to the reverse osmosis membrane component, and some of the plurality of pathways include a first pressure exchange unit, the reverse osmosis membrane component supplies concentrated salt water to the first pressure exchange unit, the first pressure exchange unit increases the pressure of the salt water supplied to the reverse osmosis membrane component on the basis of the pressure held by the concentrated salt water, and the first pressure exchange unit supplies the concentrated salt water used in the increase in pressure to a forward osmosis membrane component.

With the configuration, an amount of salt water supplied to the reverse osmosis membrane component can be properly controlled. In addition, the concentrated salt water supplied from the reverse osmosis membrane component is properly used to make it possible to reduce the power consumption and the energy consumption of the salt water desalination equipment as a whole.

Embodiments of the present invention will be described below with reference to the accompanying drawings.

First Embodiment (Explanation of Reference Technique)

FIG. 1 is a block diagram of a commonly-used salt water desalination equipment using a reverse osmosis membrane. A salt water desalination equipment 100 includes a salt water supply unit 110 and a reverse osmosis membrane component 120. The salt water supply unit 110 supplies salt water 101 to the reverse osmosis membrane component 120. The reverse osmosis membrane component is divided into a salt water path and a freshwater path, and receives the pressure of the supplied salt water to cause water molecules of the salt water in the salt water path to ooze into the freshwater path through the reverse membrane. As a result, the reverse osmosis membrane component 120 discharges freshwater 102 and concentrated salt water 103, the salt concentration of which increases.

The freshwater 102 serves as produced water and is used as daily life water, industrial water, or the like. The concentrated salt water 103 is normally discarded in the salt water desalination equipment 100. More specifically, the concentrated salt water 103 is discharged into the sea in which salt water desalination equipment 100 is popularly installed or sewers connected to the sea. In this manner, the commonly-used salt water desalination equipment 100 produces freshwater through the reverse osmosis membrane component 120 from salt water (as a matter of course, including salt water or the like obtained from a saltwater lake). In addition, concentrated salt water produced in the process of producing freshwater is discarded without being treated.

Figure 2:
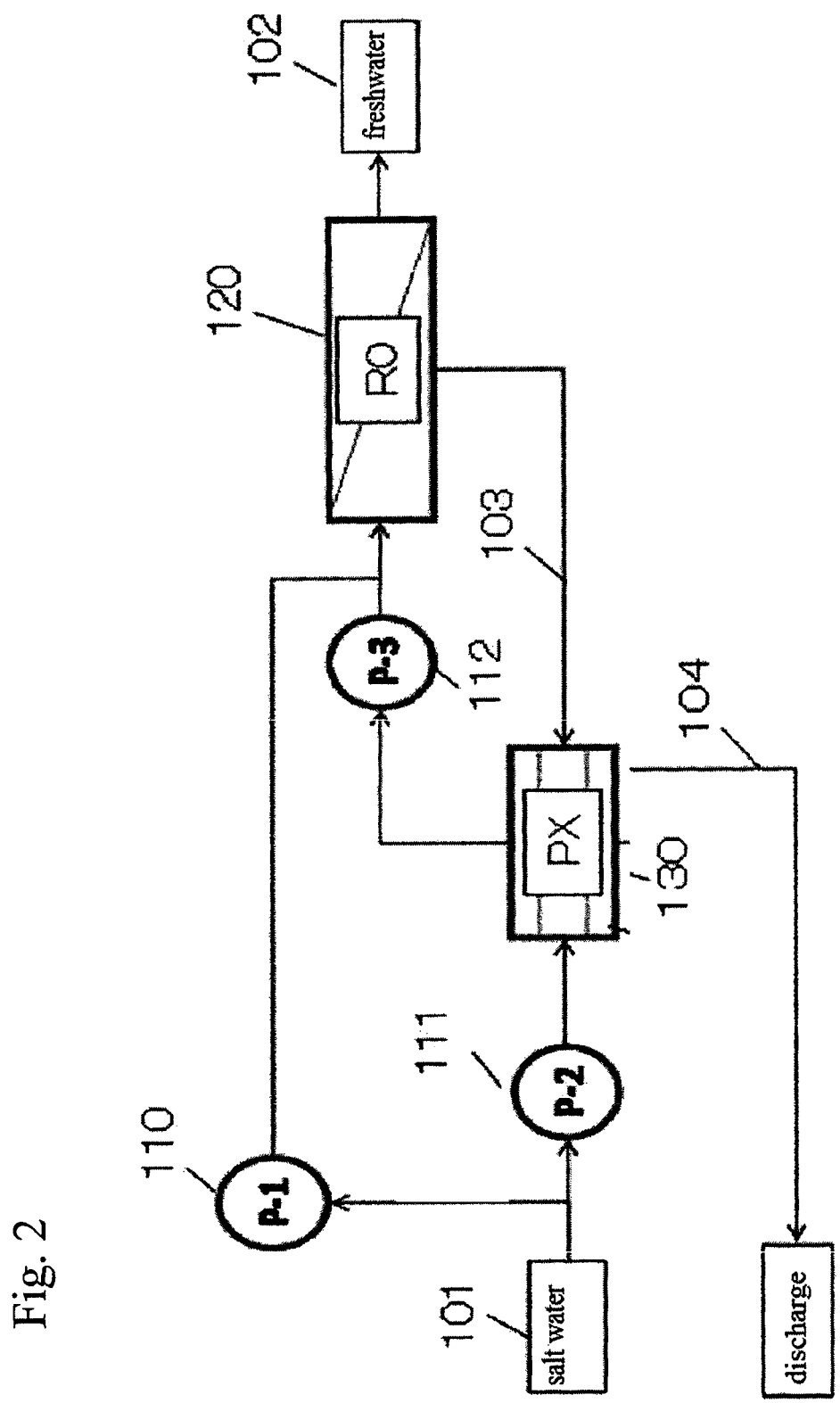
FIG. 2 is a block diagram of a power recovery type salt water desalination equipment according to a conventional technique.

In contrast to this, the concentrated salt water discharged from the reverse osmosis membrane component 120 has a predetermined pressure, and a power recovery type salt water desalination equipment using the pressure is also proposed. FIG. 2 is a block diagram of a power recovery type salt water desalination equipment according to the reference technique.

A salt water desalination equipment 200 basically supplies the salt water 101 to the reverse osmosis membrane component 120 with the salt water supply unit 110 (P-1). The reverse osmosis membrane component 120, like the salt water desalination equipment 100 in FIG. 1, causes water molecules of the supplied salt water to ooze through an osmosis membrane and produces and discharges the freshwater 102.

The reverse osmosis membrane component 120, like the salt water desalination equipment 100, discharges the concentrated salt water 103 having a pressure. The power recovery type salt water desalination equipment 200 shown in FIG. 2 uses the pressure of the concentrated salt water 103. The concentrated salt water 103 is supplied to a pressure exchange unit 130. The pressure exchange unit 130 increases a pressure generated when salt water supplied from a salt water supply unit 111 (shown as P-2 in the drawing) is supplied to the reverse osmosis membrane component 120. More specifically, the concentrated salt water 103 increases a supply pressure of salt water sent from the salt water supply unit 111 through the pressure exchange unit 130.

To the downstream side of the pressure exchange unit 130, a salt water supply unit 112 is connected. The salt water supply unit 112 finally supplies the salt water to the reverse osmosis membrane component 120. Since salt water the pressure of which is increased by the pressure exchange unit 130 pressured by the concentrated salt water 103 gets into the salt water supply unit 112, the salt water supply unit 112 can supply the salt water 101 to the reverse osmosis membrane component 120 with a pressure exceeding a pressure obtained by its own capability.

In this manner, the power recovery type salt water desalination equipment 200 shown in FIG. 2 performs parallel salt water supplies of the salt water supply unit 110 operable to directly supply the salt water 101 to the reverse osmosis membrane component 120 and the salt water supply unit 112 operable to supply salt water through the power exchange unit 130. When the salt water is parallel supplied, a load on the salt water supply unit 110 operable to draw salt water from the sea or a lake to supply the salt water is reduced. In the salt water supply unit 110, unlike in the other salt water supply unit 112 or the like, when salt water is drawn from the sea or a lake, a pressure must be increased from a nearly zero water pressure to a predetermined water pressure. For this reason, a power consumption or an energy consumption is high.

For this reason, the salt water desalination equipment 200 in FIG. 2 can reduce a power consumption and an energy consumption required for supplying salt water to the reverse osmosis membrane component 120. In particular, in comparison with the commonly-used salt water desalination equipment 100 in FIG. 1, the concentrated salt water 103 which is conventionally discarded without being utilized can be advantageously utilized. In the salt water desalination equipment 200 in FIG. 2, concentrated salt water 104 used for an increase in pressure in the pressure exchange unit 130 is discharged without being treated.

However, after the concentrated salt water 103 discharged from the reverse osmosis membrane component 120 used in the pressure exchange unit 130 is used for an increase in pressure in the pressure exchange unit 130, the pressure of the concentrated salt water 103 becomes almost zero. More specifically, the concentrated salt water 104 used in the pressure exchange unit 130 has a nearly zero pressure, the utility value of the concentrated salt water 104 when used as an energy source is lost. For this reason, the concentrated salt water 104 is discharged as described above.

In this discharge, the concentrated salt water 104 may be discharged from the salt water desalination equipment 200 into the sea or discharged into sewers. However, since the concentrated salt water 104 has a very high salt concentration, the concentrated salt water 104 discharged into the sea may adversely affect the environment. In order to reduce an environmental load occurring when the high-concentration concentrated salt water 104 is discharged into the sea, the concentrated salt water 104 is required to be mixed with freshwater (for example, river water or lake water) and to discharge into the sea. However, although freshwater is hardly obtained from salt water, mixing between the concentrated salt water 104 and freshwater is an inefficient operation. As a matter of course, since excessive steps and excessive devices are required, the countermeasure is not preferable.

In a practical problem, it is a rare that the concentrated salt water 104 is mixed with freshwater to reduce the salt concentration of the concentrated salt water 104 and then discharged. In general, it is a popular manner that extended facilities or the like are constructed to discharge the concentrated salt water 104 while diffusing the salt concentration of the concentrated salt water 104 as much as possible. However, even though the concentrated salt water is diffused and discharged, consequently, salt water having a high salt concentration is still discharged into the sea or a lake, and an environmental load is high.

In this manner, in the salt water desalination equipments 100, 200 according to the reference technique shown in FIGS. 1 and 2, problems in power recovery and an environmental load are left unsolved. In order to mitigate the problem in the environmental load, a direct environmental measure against a discharge flow and an indirect environmental measure for energy saving must be taken.

(Outline of Salt Water Desalination)

Figure 3:
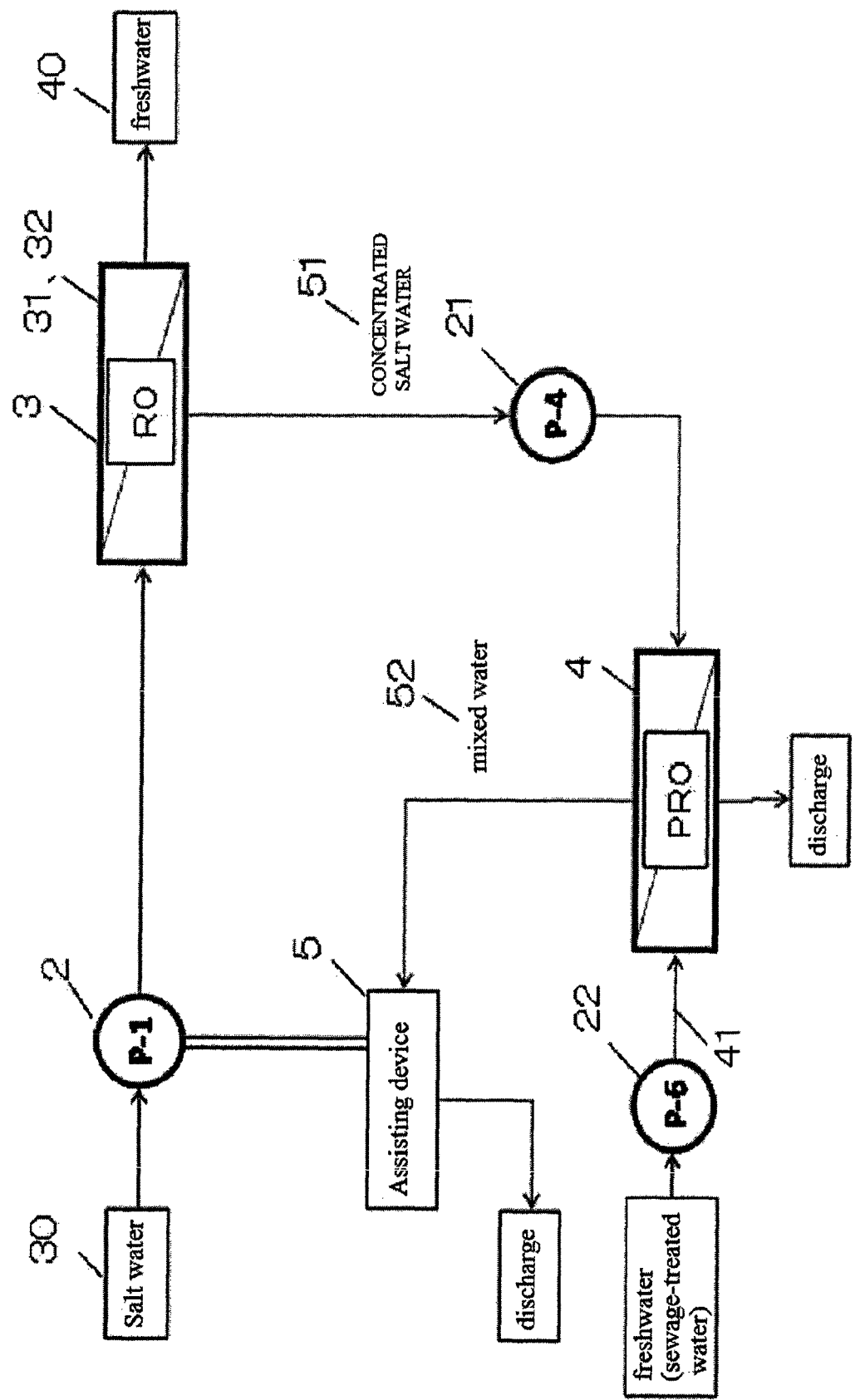
FIG. 3 is a block diagram of a salt water desalination equipment according to a first embodiment of the present invention.
Figure 4:
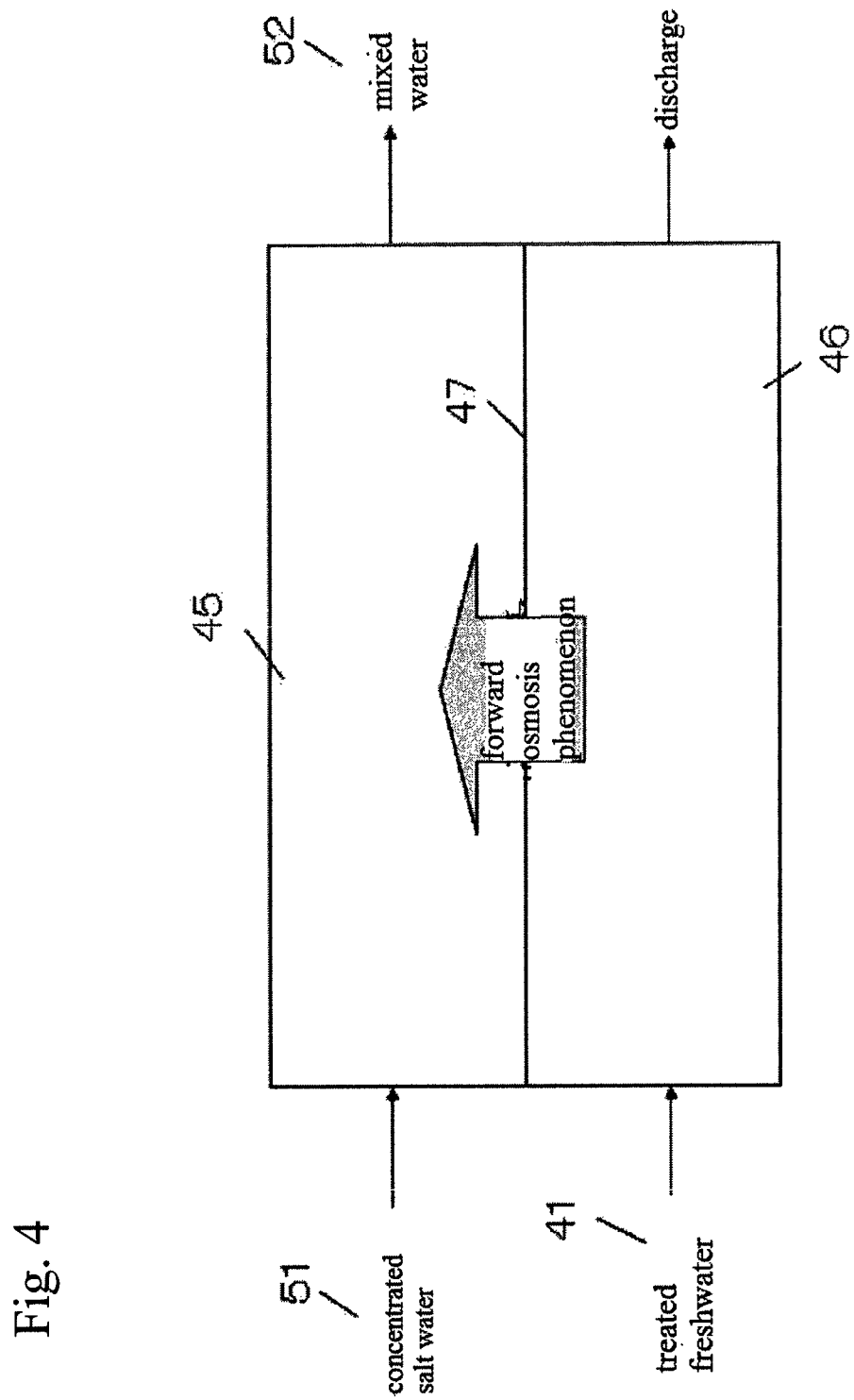
FIG. 4 is a schematic diagram of a forward osmosis membrane component in the first embodiment of the present invention.

An outline of the salt water desalination equipment according to the first embodiment of the present invention will be described below. FIG. 3 is a block diagram of the salt water desalination equipment according to the first embodiment of the present invention. FIG. 4 is a schematic diagram of a forward osmosis membrane component in the first embodiment of the present invention.

A salt water desalination equipment 1 includes, as main elements, a salt water supply unit 2, a reverse osmosis membrane component 3, a forward osmosis membrane component 4, and an assisting device 5. As a matter of course, as needed, other elements may be included.

The salt water supply unit 2 supplies salt water 30 to the reverse osmosis membrane component 3. The salt water 30 includes various waters such as sea water, lake water of a salt lake, and water which contains salt and is naturally or artificially pooled or circulated. Although the salt water supply unit 2 may be configured by various instruments or devices, the salt water supply unit 2 is properly a salt water supply pump. In the block diagrams or the like subsequent to FIG. 1, an element denoted by "P-1" or the like represents an element which is typified by a pump and has a function of sending salt water, freshwater, or the like from an upstream element to a downstream element by suction. The numerical parts of "P-1" and "P-2" are described to discriminate elements typified by pumps from each other.

The reverse osmosis membrane component 3 receives salt water supplied from the salt water supply unit 2. The reverse osmosis membrane component 3 as a reverse osmosis membrane, and has a salt water path 31 (not clearly shown in FIG. 3) to which salt water supplied from the salt water supply unit 2 is fed and through which the salt water passes by the reverse osmosis membrane, and a freshwater path 32 (not clearly shown in FIG. 3) through which freshwater obtained by removing a salt content from the salt water passing through the salt water path 31 by a reverse osmotic phenomenon obtained by the reverse osmosis membrane passes.

The reverse osmosis membrane, as generally known, by using an osmotic pressure, transmits water molecules of the salt water passing through the salt water path 31 to the freshwater path 32 side (reverse osmosis membrane phenomenon). With the transmission of the water molecules, freshwater produced from salt water is produced on the freshwater path 32 side. The produced freshwater is discharged as freshwater 40 through the freshwater path 32. More specifically, the reverse osmosis membrane component 3 produces the freshwater 40 from salt water and discharges the freshwater 40. The discharged freshwater 40 is used as daily life water or industrial water. Salt water desalination which is a basic function of the salt water desalination equipment 1 is achieved by the salt water supply unit 2 and the reverse osmosis membrane component 3.

On the other hand, in the reverse osmosis membrane component 3, while salt water passing through the salt water path 31 passes through the salt water path 31, concentrated salt water 51, the salt concentration of which is higher than that of the salt water 30 supplied by a reverse osmosis membrane phenomenon, is discharged. The concentrated salt water 51 has not only an increasing salt concentration but also a pressure higher than that of the supplied salt water 30. The concentrated salt water 51 having the increasing salt concentration and the increasing pressure is supplied by the reverse osmosis membrane component 3 to the forward osmosis membrane component 4 through other elements as needed.

In the salt water desalination equipment 1 in FIG. 3, the reverse osmosis membrane component 3 supplies the discharged concentrated salt water 51 to the forward osmosis membrane component 4 through a pump 21. The pump 21 plays a role of supplying the concentrated salt water 51 discharged from the reverse osmosis membrane component 3 to the forward osmosis membrane component 4. However, at this time, the concentrated salt water 51 may be reduced in pressure and then supplied. The pump 21 need only play a role of properly supplying the concentrated salt water 51 discharged from the reverse osmosis membrane component 3 to the forward osmosis membrane component 4. According to the constitutional specification of the salt water desalination equipment 1, the pump 21 need only reduce or increase the pressure. In the pump 21, a reduction in pressure is executed by arranging a check valve or the like.

The forward osmosis membrane component 4 receives the concentrated salt water 51 from the reverse osmosis membrane component 3 and treated freshwater 41 from a pump 22. The treated freshwater 41 may be freshwater obtained from a commonly-used water supply or treated water such as sewage-treated water. Alternatively, the treated freshwater 41 may be freshwater such as river water or lake water obtained from various freshwater sources. The forward osmotic phenomenon in the forward osmosis membrane component 4 requires both salt water containing salt and freshwater. For this reason, both the concentrated salt water 51 containing salt and the treated freshwater 41 are supplied to the forward osmosis membrane component 4.

FIG. 4 schematically shows the structure of the forward osmosis membrane component 4.

The forward osmosis membrane component 4 includes a concentrated salt water path 45 through which the supplied concentrated salt water 51 passes, a treated freshwater path 46 through which the supplied treated freshwater 41 passes, and a forward osmosis membrane 47. As indicated by an arrow in FIG. 4, with the forward osmotic phenomenon by the forward osmosis membrane 47, water molecules move from the treated freshwater path 46 to the concentrated salt water path 45. As a result, the forward osmosis membrane component 4 can produce mixed water 52 obtained by reducing the concentration of the supplied concentrated salt water 51 and discharge the mixed water 52. The treated freshwater 41 supplied to the treated freshwater path 46 is discharged after the forward osmotic phenomenon.

The forward osmosis membrane component 4 outputs the produced mixed water 52 to the assisting device 5. The assisting device 5 is connected to the salt water supply unit 2 to increase at least one of an electric power supplied to the salt water supply unit 2, a given pressure, and a rotating capability. More specifically, the assisting device 5 can reduce a load required to supply the salt water 30 of the salt water supply unit 2. In particular, the mixed water 52 discharged from the forward osmosis membrane component 4 has a predetermined pressure (the concentrated salt water 51 itself has a predetermined pressure, and the water volume of the concentrated salt water 51 is increased in the forward osmosis membrane component 4 to obtain the mixed water 52, so that the water volume of the concentrated salt water 51 having a pressure increases to obtain the mixed water 52 as a result), and the assisting device 5 can give required energy.

The mixed water 52 has a water volume larger than that of the inflow concentrated salt water 51 by adding seepage water obtained in the forward osmosis membrane component 4 to the concentrated salt water 51 flowing in the forward osmosis membrane component 4. As a matter of course, water such as freshwater or treated water having a low salt concentration flows into the forward osmosis membrane component 4, and the water having a low salt concentration is added as seepage water to make the salt concentration of the mixed water 52 lower than that of the concentrated salt water 51. First, the mixed water 52 assumed as finally discharged water as described above has a lower salt concentration. As the first point, with the reduction in salt concentration of the discharged water, an environmental load is directly reduced.

On the other hand, the water volume of the mixed water 52, as described above, is larger than the water volume of the concentrated salt water 51 flowing into the forward osmosis membrane component. The water volume of the high-water-pressure concentrated salt water 51 output from the reverse osmosis membrane component 3 is increased with the water pressure to obtain the mixed water 52 as a result. The salt water desalination equipment 1 according to the first embodiment (also in a second embodiment (will be described later) or the like) can distribute the increasing water volume (having a water pressure) to various pathways.

This distribution is variously performed to make it possible to operate various components connected to the downstream side of the forward osmosis membrane component 4. More specifically, the mixed water 52 having a predetermined pressure operates the various elements, so that, in comparison with the conventional technique, a pump or the like can be operated with the mixed water 52. As a result, as a second point, an energy-saving operation can be realized in the entire salt water desalination equipment 1. As a result, an environmental load can be indirectly reduced.

As in the explanation performed with reference to FIG. 2 showing the reference technique, in the salt water desalination equipment 200 having only the reverse osmosis membrane component 120, concentrated salt water discharged from the reverse osmosis membrane component 120 exhausts its own energy in the pressure exchange unit 130. In this case, a reduction in load on the salt water supply unit 110 operable to require most of a power consumption and most of an energy consumption is limited.

In contrast to this, in the salt water desalination equipment 1 according to the first embodiment described with reference to FIGS. 3 and 4, the mixed water 52 in which a predetermined water volume and a predetermined pressure remain is supplied from the forward osmosis membrane component 4 to the assisting device 5. The assisting device 5, as described above, supplies a part of required energy to the salt water supply unit 2 to make it possible to reduce the power consumption and the energy consumption of the salt water supply unit 2.

As described above, the salt water desalination equipment 1 according to the first embodiment can reduce a load on the salt water supply unit 2 operable to require most of the power consumption and most of the energy consumption to make it possible to reduce the power consumption and the energy consumption. As a result, the running cost of the salt water desalination equipment 1 can be reduced, and the popularization of the salt water desalination equipment 1 can be enhanced.

The mixed water 52 is used in the assisting device 5 and the discharged. In this case, the mixed water 52 receives water molecules from the treated freshwater 41 in the forward osmosis membrane component 4, and has a salt concentration lower than that of the concentrated salt water 51. For this reason, after the mixed water 52 is used in the assisting device 5, even though the mixed water 52 is discharged into the sea or a lake, an environmental load can be kept low. This is an advantage different from that in the explanation of the reference technique in FIG. 2.

The salt water desalination equipment 1 according to the first embodiment can make a reduction in energy consumption and a reduction in environmental load compatible, and the popularization of installation of the salt water desalination equipment 1 can be achieved from both the aspects.

Details of the components will be described below.

(Salt Water Supply Unit)

The salt water supply unit 2 sucks salt water from a natural or artificial salt water source such as the sea or a lake and supplies the salt water to the salt water desalination equipment 1. In particular, the salt water supply unit 2 supplies salt water to the reverse osmosis membrane component 3. As a matter of course, depending on the configuration of the salt water desalination equipment 1, another element may be interposed between the salt water supply unit 2 and the reverse osmosis membrane component 3. Even in this case, the salt water supply unit 2 has as its object to finally provide salt water to the reverse osmosis membrane component 3.

When a salt water supply pump is used as a practical example of the salt water supply unit 2, any one of a positive displacement pump, a centrifugal pump, and pumps of other types may be used.

The salt water supply unit 2 is a main element which supplies salt water to the reverse osmosis membrane component 3. For this reason, for example, in a salt water desalination equipment having another configuration (will be described later), another supply unit may be disposed in parallel with the salt water supply unit 2. In this case, the salt water supply unit 2 has a low load for supplying salt water to the reverse osmosis membrane component 3. In other words, a plurality of supply unit disposed in parallel with each other supply required salt water to the reverse osmosis membrane component 3.

The salt water supply unit 2 may include a plurality of salt water supply pumps which are sequentially connected to each other. With the salt water supply pumps sequentially connected to each other, a large amount of salt water can be strongly sucked from the salt water source and can be supplied to the reverse osmosis membrane component 3.

In this case, even though the salt water supply unit 2 is disposed in parallel with the other supply unit, since the salt water supply unit must suck salt water from the salt water source and supply the salt water to the reverse osmosis membrane component 3, the maximum load is applied to the salt water supply unit 2 in the salt water desalination equipment 1. As a matter of course, when an entire configuration including the salt water supply unit 2 and the other supply unit disposed in parallel therewith and sequentially disposed is regarded as the salt water supply unit, the maximum load is applied to the salt water supply unit 2, as a matter of course. The high load unit that the salt water supply unit 2 requires the maximum power consumption in the salt water desalination equipment 1.

The salt water desalination equipments 1 having various sizes are installed at various places depending on the characteristics of set salt water sources, topographic characteristics, amounts of demanded freshwater, funds for installation. Depending on circumstances, although an amount of demanded freshwater is large, due to a lack of electric power infrastructure, the salt water desalination equipment 1 having a size which can cover the amount of demanded freshwater may not be able to be installed.

By using the salt water desalination equipment 1 according to the present invention, when the power consumption of the salt water supply unit 2 is reduced, the salt water desalination equipment 1 including the salt water supply unit 2 having a sufficient salt water supply capacity can be installed at a place where an electric power infrastructure lacks. This is because an amount of freshwater which can be supplied by the salt water desalination equipment 1 is in proportion to an amount of salt water supplied from the salt water source by the salt water supply unit 2.

(Each Pump)

Even on another configuration (will be described later) of the salt water desalination equipment 1 and the configuration of the salt water desalination equipment 1 according to the first embodiment described with reference to FIG. 3, a plurality of pumps are disposed. These pumps are disposed when salt water, concentrated salt water, and freshwater are supplied to the various elements such as the reverse osmosis membrane component 3, the forward osmosis membrane component 4, the assisting device 5, and the pressure exchange unit operable to configure the salt water desalination equipment 1. More specifically, the pumps are components which are interposed between the various elements.

Each of the pumps increases the pressure to supply salt water, freshwater, or the like to the various elements. Alternatively, depending on the characteristics and specifications of the elements, the pump reduces the pressure to supply salt water, freshwater, or the like to the various elements. For this reason, the pump is used for an increase in pressure, and a throttle valve or the like is used for a reduction in pressure.

For example, the concentrated salt water 51 is supplied from the reverse osmosis membrane component 3 to the forward osmosis membrane component 4, on the basis of the characteristics (in addition to the concentrated salt water 51, the treated freshwater 41 is supplied) of the forward osmosis membrane component 4, the throttle valve operating independently of the pump 21 reduces the pressure of the concentrated salt water 51 to supply the concentrated salt water 51 to the forward osmosis membrane component 4.

In this manner, the plurality of pumps, the throttle valves, and the like disposed at positions of the salt water desalination equipment 1 performs an increase in pressure and a reduction in pressure depending on the characteristics of the elements serving as sources and destinations. In the drawing such as FIG. 3 showing the salt water desalination equipment, each of the plurality of pumps is typically shown as one element. However, a pump shown as one pump may be achieved by a plurality of pump elements.

(Reverse Osmosis Membrane Component)

In the reverse osmosis membrane component 3, water molecules of the supplied salt water 30 are osmosed with a reverse osmosis membrane phenomenon obtained by the reverse osmosis membrane, and the freshwater 40 is produced and discharged. In accordance with this, salt water the water molecules of which are reduced is discharged from the reverse osmosis membrane component 3 as the concentrated salt water 51, the salt concentration of which is increased. The concentrated salt water 51 also has a pressure. The concentrated salt water 51 having the high salt concentration and the high pressure is supplied to the forward osmosis membrane component 4 by the reverse osmosis membrane component 3.

Figure 5:
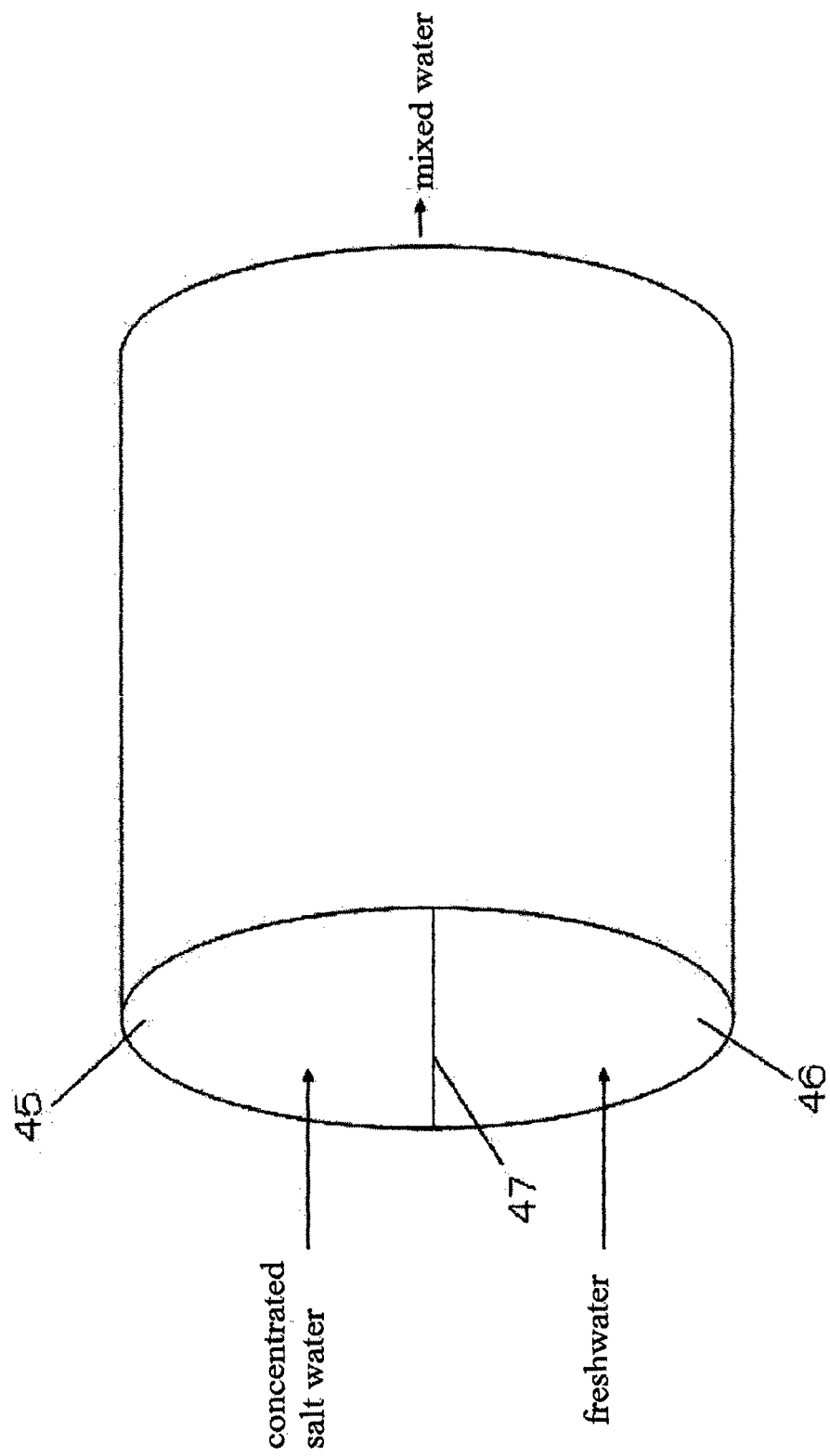
FIG. 5 is a schematic diagram showing an example of the forward osmosis membrane component in the first embodiment.

The reverse osmosis membrane component 3, like the forward osmosis membrane component 4, has a path through which the salt water 30 passes and a path which is partitioned by the reverse osmosis membrane and through which the freshwater 40 as a result of osmosis of water molecules. FIG. 5 is a schematic diagram of the forward osmosis membrane component 4. The reverse osmosis membrane component 3 also has the same configuration as that in FIG. 5. More specifically, when it is assumed that the forward osmosis membrane component 4 shown in FIG. 5 is replaced with the reverse osmosis membrane component 3, the concentrated salt water path 45 in FIG. 5 is a salt water path of the reverse osmosis membrane component 3.

Similarly, when it is assumed that the forward osmosis membrane component 4 shown in FIG. 5 is replaced with the reverse osmosis membrane component 3, the treated freshwater path 46 in FIG. 5 is a freshwater path when the forward osmosis membrane component 4 is replaced with the reverse osmosis membrane component 3.

FIG. 5 is only a schematic diagram for understandably explaining the function of the forward osmosis membrane component 4, and the structure in FIG. 5 is different from the structure of the forward osmosis membrane component 4 which is actually manufactured. The actually manufactured forward osmosis membrane component 4 frequently has a structure shown in FIG. 6.

Figure 6:
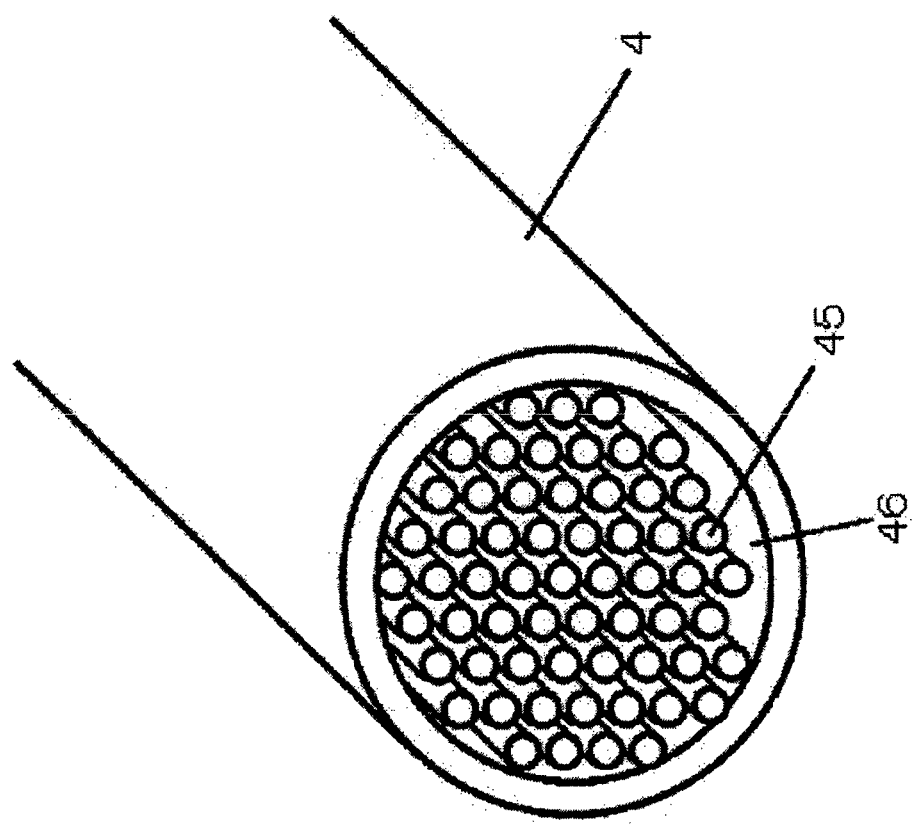
FIG. 6 is a schematic diagram showing another example of the forward osmosis membrane component in the first embodiment.

The reverse osmosis membrane component 3 has the same configuration as that of the forward osmosis membrane component 4 having another shape shown in FIG. 6 in many cases. The forward osmosis membrane component 4 in FIG. 6 is configured by a plurality of narrow tubes (tubes each having a straw-like shape) and a pipe line covering the outer peripheries of the plurality of narrow tubes. Each of the plurality of narrow tubes serves as the treated freshwater path 46, and a remaining part except for the plurality of narrow tubes in the pipe line serves as the concentrated salt water path 45.

In the reverse osmosis membrane component 3 having the same configuration as that of the forward osmosis membrane component 4 shown in FIG. 6, each of the plurality of narrow tubes serves as the treated freshwater path 45, and a remaining part serves as the concentrated salt water path 46. The reverse osmosis membrane component 3 discharges the concentrated salt water 51 and the freshwater 40 from the paths, respectively. When the reverse osmosis membrane component has the configuration as shown in FIG. 6, the surface area of the reverse osmosis membrane increases, the desalination capability in the reverse osmosis membrane component 3 is improved.

Since the reverse osmosis membrane phenomenon is explained in various known documents, the explanation thereof is not performed. With mechanisms explained in the various known documents, the reverse osmosis membrane component 3 obtains the freshwater 40 from the salt water 30.

As described above, the reverse osmosis membrane component 3 produces the freshwater 40 from the salt water 30 and supplies the concentrated salt water 51, the salt concentration of which is high to the forward osmosis membrane component 4.

(Forward Osmosis Membrane Component)

The forward osmosis membrane component 4, with the forward osmosis membrane phenomenon described with reference to FIG. 4, osmoses the water molecules from the treated freshwater 41 into the concentrated salt water 51 to decrease the salt concentration of the concentrated salt water 51. The forward osmosis membrane component 4 produces the mixed water 52 with the osmosis of the water molecules from the treated freshwater 41 into the concentrated salt water 51. The forward osmosis membrane component 4 discharges the mixed water 52. Since the water molecules from the treated freshwater 41 are given to the concentrated salt water 51, the mixed water 52 has a salt concentration lower than that of the concentrated salt water 51. For this reason, even though the mixed water 52 is used in the components on the downstream side of the forward osmosis membrane component 4, salt water having a high salt concentration is not discarded. Thus, the environmental load can be prevented from being adversely affected.

Since the water molecules are added to the concentrated salt water 51, the water volume of the mixed water 52 increases. Since the water volume increases, the forward osmosis membrane component 4 can supply the mixed water 52, the water volume of which increases to the assisting device 5 while leaving a predetermined pressure. The increasing water volume is properly distributed to make it possible to cause the mixed water 52 to operate the assisting device 5. With this operation, the assisting device 5 can reduce a load (power consumption) on the salt water supply unit 2.

FIG. 5 is a schematic diagram showing an example of the forward osmosis membrane component in the first embodiment. Although described in the reverse osmosis membrane component 3, the forward osmosis membrane component 4, as shown in FIG. 5, has the concentrated salt water path 45 and the treated freshwater path 46. The paths are partitioned with the forward osmosis membrane 47.

FIG. 6 is a structure sectional view of the forward osmosis membrane component in the first embodiment. The forward osmosis membrane component 4 is configured by a plurality of narrow tubes and a pipe line covering the narrow tube. Each of the plurality of narrow tubes is made of a forward osmosis membrane, and each of the narrow tubes is the treated freshwater path 46, and a remaining part in the pipe line is the concentrated salt path 45. With this configuration, the surface area of the forward osmosis membrane increases, and the capability of forward osmosis membrane phenomenon increases, so that the amount of the produced mixed water 52 increases.

The forward osmosis membrane component 4 shown in FIGS. 5 and 6 is an example, and may have another configuration. The forward osmosis membrane phenomenon is explained in the various known documents, and is not explained in terms of its mechanism here.

(Assisting Device)

The assisting device 5 receives the mixed water 52 produced and discharged by the forward osmosis membrane component 4. The mixed water 52 has a predetermined water volume and a predetermined pressure. The assisting device 5 operates by the predetermined water volume and the predetermined pressure. The assisting device 5 is dynamically connected to the salt water supply unit 2, and energy generated by the operation of the assisting device 5 assists the operation of the salt water supply unit 2.

The assisting device 5 may have, for example, an electric generating function. In this case, the assisting device 5 has a turbine and a generating unit, and generates electricity with the water volume and the pressure of the supplied mixed water 52. An electric power generated by the electric power generation is supplied to the salt water supply unit 2 to cover a part of an electric power required for the salt water supply unit 2. As a result, the power consumption of the salt water supply unit 2 can be reduced.

Alternatively, the assisting device 5 may have at least one of a pressure generating function and a pressure transmitting function. In this case, the assisting device 5 is configured by a pressure exchange unit (pressure changer or the like), and exchanges a pressure of the supplied mixed water 52 into a pressure of the salt water supply unit 2 to contribute to an increase in pressure of the salt water supply unit 2. As a result, the power consumption of the salt water supply unit 2 can be reduced.

Alternatively, the assisting device 5 may have a rotation giving function. For example, the assisting device 5 has a rotating component connected to the rotating shaft of the salt water supply unit 2, and the rotating component rotates on the basis of the water volume and the pressure of the supplied mixed water 52. The rotation of the rotating component can increase at least one of the rotating speed and the torque of the salt water supply unit 2 through the connected rotating shaft. As a result, a power consumption of the salt water supply unit 2 can be reduced.

In this manner, the assisting device 5 uses at least one of the water volume and the pressure of the mixed water 52 to assist the load on the salt water supply unit 2 so as to contribute to reductions in power consumption and energy consumption of the salt water supply unit 2.

The assisting device 5 discharges the used mixed water 52. The mixed water is finally discharged into sewers, rivers, lakes, the sea, or the like. However, the mixed water 52 has a salt concentration lower than that of the concentrated salt water 51. For this reason, unlike in the case explained in the reference technique, an environmental load caused by discharging concentrated salt water having a high salt concentration can be reduced.

As a result, both the reduction in electric power or the like required by the salt water supply unit 2 and a decrease in salt concentration of wastewater can be achieved, and the salt water desalination equipment 1 according to the first embodiment can reduce the environmental load.

Second Embodiment

A second embodiment will be described below. In the second embodiment, various variations of a salt water desalination equipment will be described.

(Variation 1)

Figure 7:
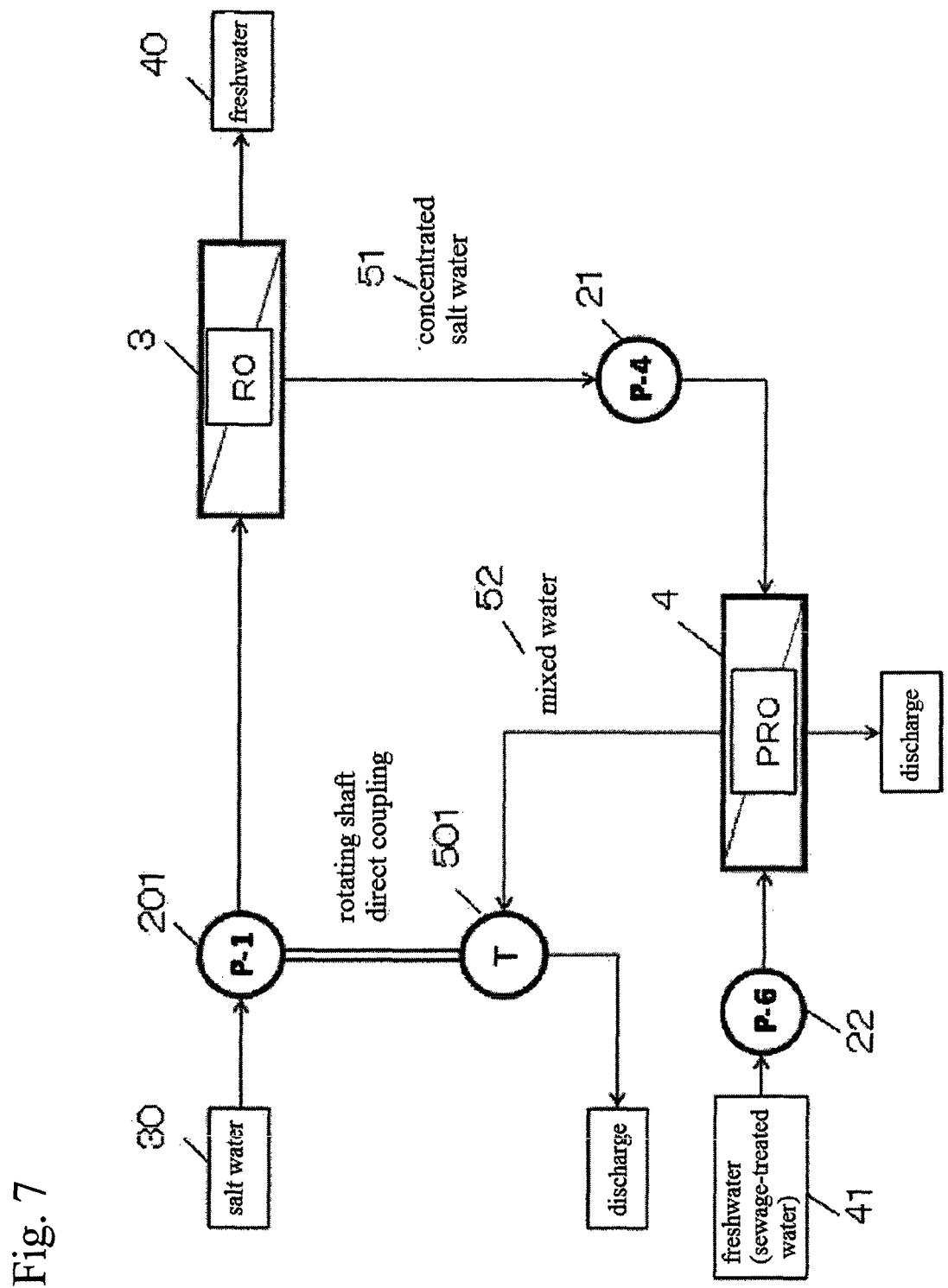
FIG. 7 is a block diagram of a salt water desalination equipment in variation 1 of a second embodiment of the present invention.

FIG. 7 is a block diagram of a salt water desalination equipment in variation 1 of the second embodiment of the present invention. A salt water desalination equipment 1A has the same basic idea and the same configuration as those in the salt water desalination equipment 1 described in the first embodiment.

In the salt water desalination equipment 1A, the assisting device 5 is a rotation assisting component 501. In this case, the salt water supply unit 2 is a salt water supply pump 201 which rotates along a rotating shaft to supply salt water. The rotation assisting component 501 has a rotating shaft, and the rotating shaft is directly connected to the rotating shaft of the salt water supply pump 201.

The rotation assisting component 501 receives the mixed water 52 supplied from the forward osmosis membrane component 4 and rotates. Since the mixed water 52 has a predetermined water volume and a predetermined pressure, the mixed water 52 can rotate the rotation assisting component 501. In response to the rotation, the rotating shaft of the rotation assisting component 501 rotates. For example, the rotation assisting component 501 has a bladed wheel or the like connected to the rotating shaft, and the mixed water 52 collides with the bladed wheel to rotate the bladed wheel. With the rotation of the bladed wheel, the rotating shaft also rotates as a matter of course.

The rotating shaft of the rotation assisting component 501 is directly connected to the rotating shaft of the salt water supply pump 201. With this direct connection, at least one of the rotating speed and the torque of the salt water supply pump 201 increases. When at least one of the rotating speed and the torque increases, the supply capacity of the salt water 30 by the salt water supply pump 201 increases. In other words, when a salt water supply capability does not change, an electric power or energy required by the salt water supply pump 201 itself except for the rotation assisting component 501 can be reduced by assistance for rotation performed by the rotation assisting component 501.

Since the mixed water 52 has a predetermined water volume and a predetermined pressure, the mixed water 52 can easily rotate the rotation assisting component 501 having the bladed wheel or the like. The rotation of the rotation assisting component 501 can also be easily added to the rotation of the salt water supply pump 201. As a result, the load on the salt water supply pump 201 decreases, and the power consumption and the energy consumption can be reduced.

As a matter of course, the mixed water 52 supplied to rotate the rotation assisting component 501 is discharged. However, since the salt concentration is reduced in the forward osmosis membrane component 4, the discharged mixed water 52 has a small environmental load.

(Variation 2)

Figure 8:
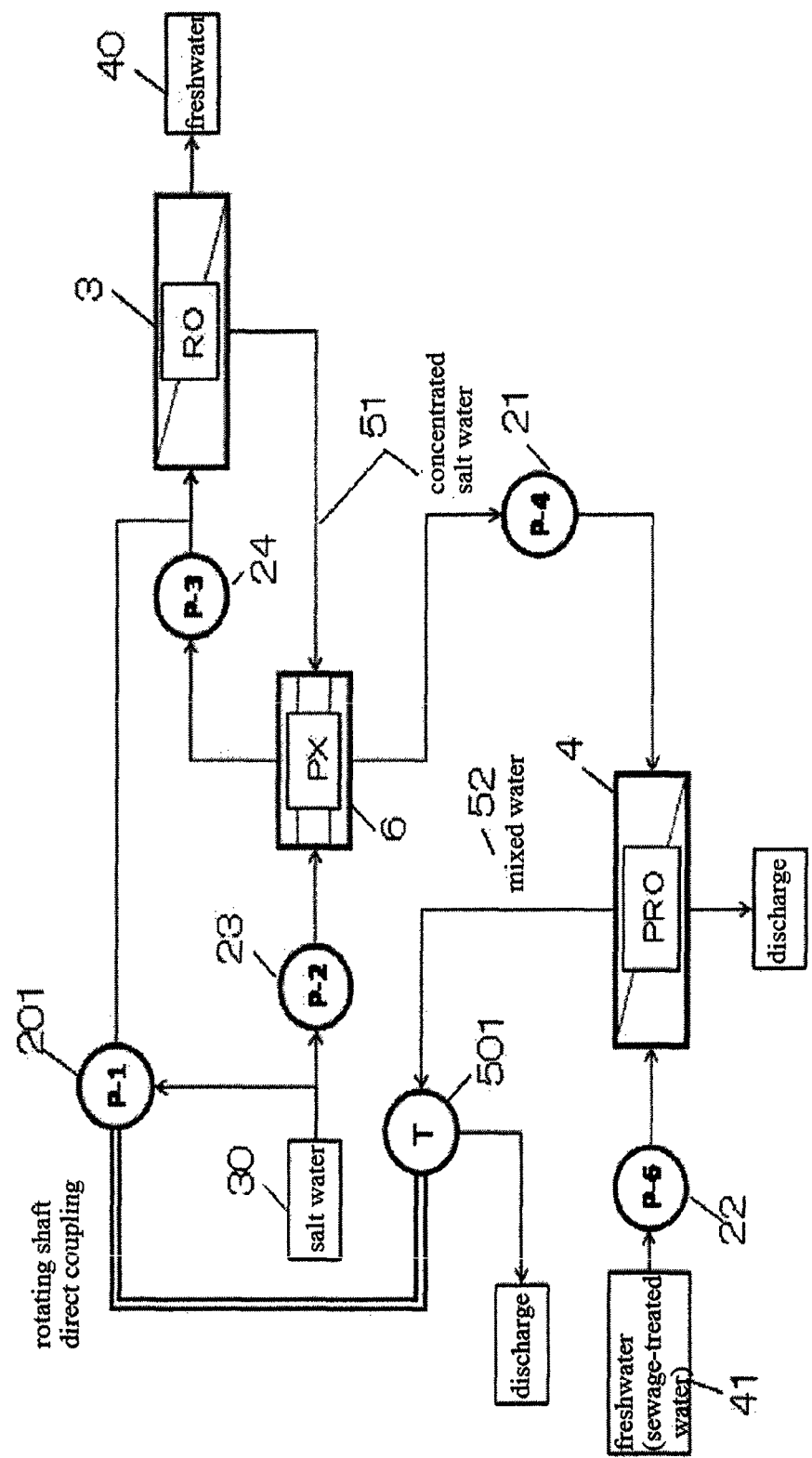
FIG. 8 is a block diagram of a salt water desalination equipment corresponding to variation 2 in the second embodiment of the present invention.

FIG. 8 is a block diagram of a salt water desalination equipment corresponding to variation 2 in the second embodiment of the present invention. A salt water desalination equipment 1B includes the same idea as that in variation 1 in terms of use of the mixed water 52 obtained by thinning, by the forward osmosis membrane component 4, the concentrated salt water 51 discharged from the reverse osmosis membrane component 3.

(Parallelization of Salt Water Supply)

In the salt water desalination equipment 1B corresponding to variation 2, supply of the salt water 30 to the reverse osmosis membrane component 3 is parallelized. The salt water supply unit 2, as in the salt water desalination equipment 1A of variation 1, uses the salt water supply pump 201 which rotates on the basis of the rotating shaft to supply salt water 30.

The salt water 30 is supplied to the reverse osmosis membrane component 3 through a pump 23 and a pressure exchange unit 6 while passing through a route (in parallel) different from that of the salt water supply pump 201. The pressure exchange unit 6 increases the pressure of the salt water 30 supplied from the pump 23 by using the concentrated salt water 51 discharged from the reverse osmosis membrane component 3.

The pressure exchange unit 6 is known as a pressure changer or the like, and has a role to increase a pressure of liquid traveling in a certain pathway by a pressure of another liquid supplied from another pathway. For this reason, the concentrated salt water 51, the salt concentration and the pressure of which are increased by the reverse osmosis membrane component 3, is supplied to the pressure exchange unit 6. With the pressure of the concentrated salt water 51, the pressure of the salt water 30 supplied from the pump 23 increases, and the salt water 30 is supplied to the reverse osmosis membrane component 3.

In the salt water desalination equipment 1B, with parallelization of salt water supply, the power consumption and the energy consumption of the salt water supply pump 201 serving as the salt water supply unit 2 can be reduced.

(Recycle in Forward Osmosis Membrane Component)

Since the pressure exchange unit 6 only uses the pressure of the concentrated salt water 51, the pressure of the concentrated salt water 51 used in the pressure exchange unit 6 is almost eliminated, and the concentrated salt water 51 is discharged from the pressure exchange unit 6. On the other hand, the concentrated salt water 51 is discharged from the pressure exchange unit 6 without changing the salt concentration of the concentrated salt water 51.

The concentrated salt water 51, the salt concentration of which is not changed, is supplied to the forward osmosis membrane component 4 by the pump 21.

The forward osmosis membrane component 4 produces the mixed water 52 by a forward osmosis membrane phenomenon for the treated freshwater 41 and the concentrated salt water 51 separately supplied. For this reason, when the concentrated salt water 51 supplied to the forward osmosis membrane component 4 does not have a high pressure but have a high salt concentration, the mixed water 52 can be produced by the forward osmosis membrane phenomenon. The mixed water 52 is produced such that water molecules from the treated freshwater are osmosed into the concentrated salt water 51. For this reason, the forward osmosis membrane component 4 can discharge the mixed water 52, the water volume of which is larger than that of the concentrated salt water 51. The pump 21 generates a predetermined pressure to supply the concentrated salt water 51 to the forward osmosis membrane component 4. The pump 21 supplies the concentrated salt water 51 to the forward osmosis membrane component 4 without delay, and the forward osmosis membrane component 4 produces the mixed water 52 having a water volume larger than that of the concentrated salt water 51 and discharges the mixed water 52.

The mixed water 52 having the water volume and the pressure can rotate the rotation assisting component 501. The rotation assisting component 501 has a rotating shaft directly connected to the rotating shaft of the salt water supply pump 201, and the rotation of the rotation assisting component 501 can assist the rotation of the salt water supply pump 201. The advantage of the assistance is the same as that explained in the salt water desalination equipment 1A in variation 1.

As described above, the concentrated salt water 51, the pressure of which is lost by being used in the pressure exchange unit 6, passes through the forward osmosis membrane component 4 to operate the rotation assisting component 501 again so as to assist the rotation of the salt water supply pump 201. As a result, the rotation assisting component 501 can reduce the power consumption and the energy consumption of the salt water supply pump 201.

(Advantage of Variation 2)

As has been described above, in the salt water desalination equipment 1B corresponding to variation 2, supply paths of the salt water 30 from the salt water source to the reverse osmosis membrane component 3 are separated in parallel with each other, the pressure exchange unit 6 serving as one supply path uses the concentrated salt water 51 discharged from the reverse osmosis membrane component 3 to increase a pressure. With this process, a load (power consumption or energy consumption) on the salt water supply pump 201 serving as a main element of the salt water supply unit 2 can be reduced. In addition, a salt concentration of the concentrated salt water 51, the pressure of which is lost in the pressure exchange unit 6, is utilized by the forward osmosis membrane component 4 to cause the rotation of the rotation assisting component 501. The rotation of the rotation assisting component 501 can further reduce the load (power consumption and energy consumption) on the salt water supply pump 201 serving as a main element of the salt water supply unit 2.

More specifically, the concentrated salt water 51 discharged from the reverse osmosis membrane component 3 is used on two aspects including an aspect of pressure and an aspect of salt concentration to make it possible to further reduce the power consumption and the energy consumption of the salt water supply unit 2.

As a matter of course, since the mixed water 52 to be finally discarded and discharged has a low salt concentration, deterioration in environmental load need not be concerned as in the first embodiment and variation 1.

(Variation 3)

A salt water desalination equipment in variation 3 will be described below.

Figure 9:
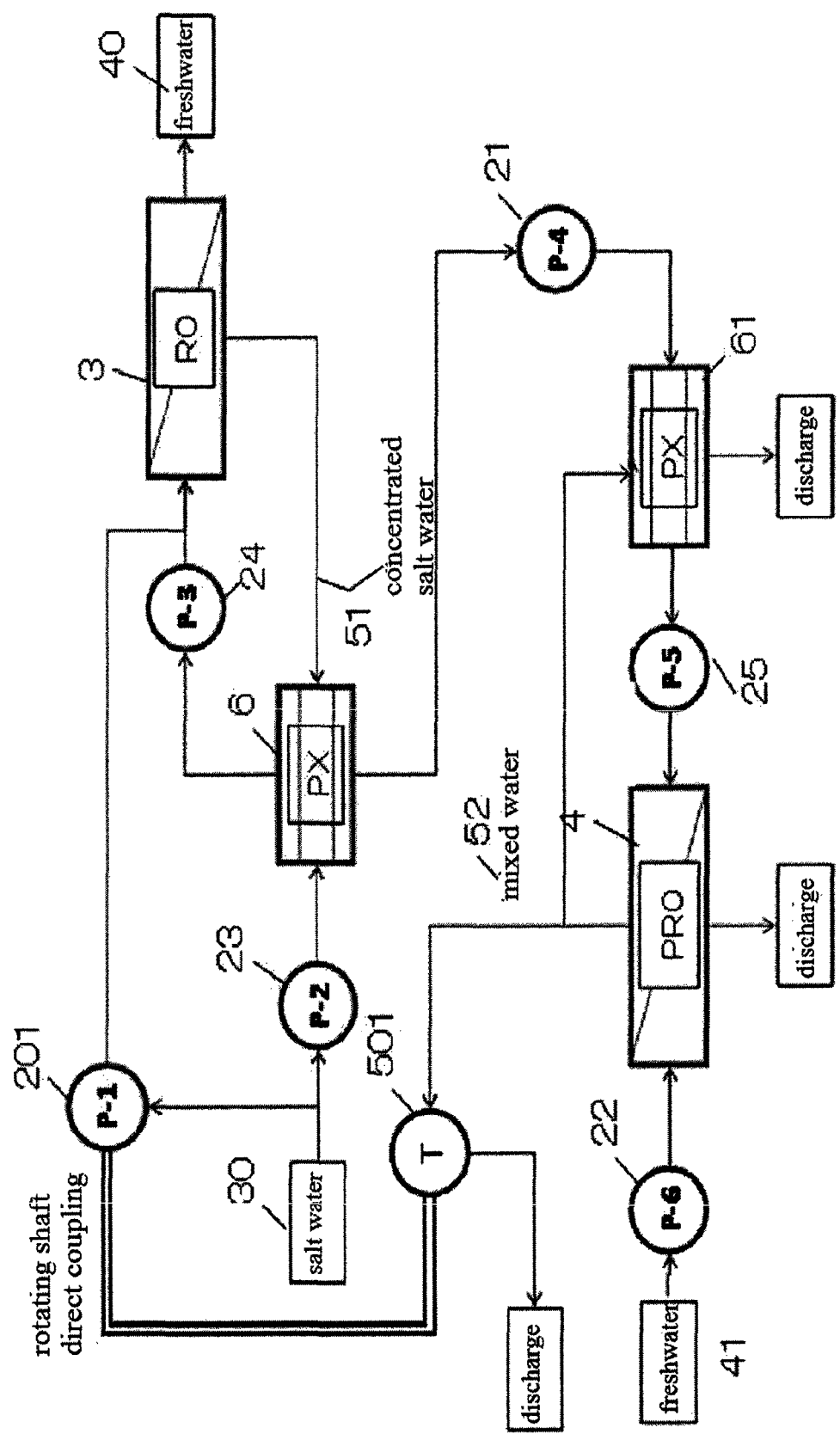
FIG. 9 is a block diagram of a salt water desalination equipment corresponding to variation 3 in the second embodiment of the present invention.

FIG. 9 is a block diagram of a salt water desalination equipment corresponding to variation 3 in the second embodiment of the present invention. A salt water desalination equipment 1C, unlike the salt water desalination equipment 1B shown in FIG. 8, on a pathway through which the concentrated salt water 51 from the pressure exchange unit 6 reaches the forward osmosis membrane component 4, another pressure exchange unit 61 is further disposed.

The configuration and the basic ideas of the salt water desalination equipment 1C are the same as those of the salt water desalination equipment 1B corresponding to variation 2 except that the pressure exchange unit 61 is further disposed. More specifically, the pathways for supplying the salt water 30 to the reverse osmosis membrane component 3 are parallelized to reduce the power consumption and the energy consumption of the salt water supply pump 201. In addition, the pressure of the concentrated salt water 51 discharged from the reverse osmosis membrane component 3 is used in the pressure exchange unit 6 once to reduce the power consumption and the energy consumption of the salt water supply pump 201. Furthermore, the concentrated salt water 51, the pressure of which is lost in the pressure exchange unit 6, is recycled by the forward osmosis membrane component 4 to rotate the rotation assisting component 501 serving as an assisting device so as to reduce the power consumption and the energy consumption of the salt water supply pump 201. The basic ideas are the same as those in variation 3.

(Pressure Exchange Unit 61)

The pressure exchange unit 61 is disposed between the pressure exchange unit 6 and the forward osmosis membrane component 4. The pump 21 is disposed on the upstream side of the pressure exchange unit 61, and the concentrated salt water 51 used to increase the pressure of the salt water 30 in the pressure exchange unit 6 is supplied to the pressure exchange unit 61 with the pump 21.

Although the pump 21 can increase the pressure enough to supply the concentrated salt water 51 to the pressure exchange unit 61, when the pump 21 operates to further increase the pressure, the power consumption or the energy consumption in the pump 21 increases to make it impossible to achieve an object to reduce the power consumption or the like in the entire salt water desalination equipment 1C. For this reason, the concentrated salt water 51 supplied to the pressure exchange unit 61 with the pump 21 has only a pressure required to be supplied.

In this case, the mixed water 52 produced by the forward osmosis membrane component 4 is supplied to the pressure exchange unit 61. The mixed water 52 produced by the forward osmosis membrane component 4, as has been described above, basically has a pressure equal to the pressure of the concentrated salt water 51 supplied to the forward osmosis membrane component 4 and increases in water volume.

The pressured mixed water 52 is supplied to the pressure exchange unit 61 through the other supply path to increase the pressure of the concentrated salt water 51 from the pump 21 supplied to the main stream of the power exchange unit 61, and the concentrated salt water 51 is discharged from the pressure exchange unit 61. More specifically, a state in which the pressure of the concentrated salt water 51 supplied to the forward osmosis membrane component 4 increases is obtained.

Since the pressure of the concentrated salt water 51 supplied to the forward osmosis membrane component 4 is high, the energy of the mixed water 52 discharged by the forward osmosis membrane component 4 becomes high. This is because, since the energy is given by multiplying a pressure by a water volume, the supply at a high pressure increases the energy of the mixed water 52 discharged by the forward osmosis membrane component 4.

The salt water desalination equipment 1C of variation 3 shown in FIG. 9 increases the energy of the mixed water 52 supplied from the forward osmosis membrane component 4 to the rotation assisting component 501 to achieve an advantage that the capability of the rotation assisting component 501 is improved.

In addition, all the mixed water 52 produced by the forward osmosis membrane component 4 is not supplied to the rotation assisting component 501, and a part of the mixed water 52 is supplied to the pressure exchange unit 61. The pressure exchange unit 61 has energy efficiency higher than that of the rotation assisting component 501. The pressure exchange unit 61, as described above, increases the pressure of the concentrated salt water 51 to make it possible to increase the energy of the mixed water 52 discharged by the forward osmosis membrane component 4.

More specifically, a part of the mixed water 52 is supplied to the pressure exchange unit 61, and the increase in energy of the mixed water 52 can be efficiently performed. Since a part of the mixed water 52, the energy of which is increased, is used in the rotation assisting component 501, the power consumption and the energy consumption of the salt water supply pump 201 can be reduced by the rotation assisting component 501. In this case, an advantage that the energy consumption of the pump which gives a pressure to the concentrated salt water 51 discharged by the reverse osmosis membrane component 3 is achieved, and the energy consumption in the entire salt water desalination equipment 1C can be reduced.

The salt water desalination equipment 1C corresponding to variation 3 distributes the mixed water 52 discharged from the forward osmosis membrane component 4 to the rotation assisting component 501 and the pressure exchange unit 61 to achieve an object to reduce the energy consumptions of the salt water supply pump 201 and the pump 21 in a balanced manner.

(Variation 4)

Figure 10:
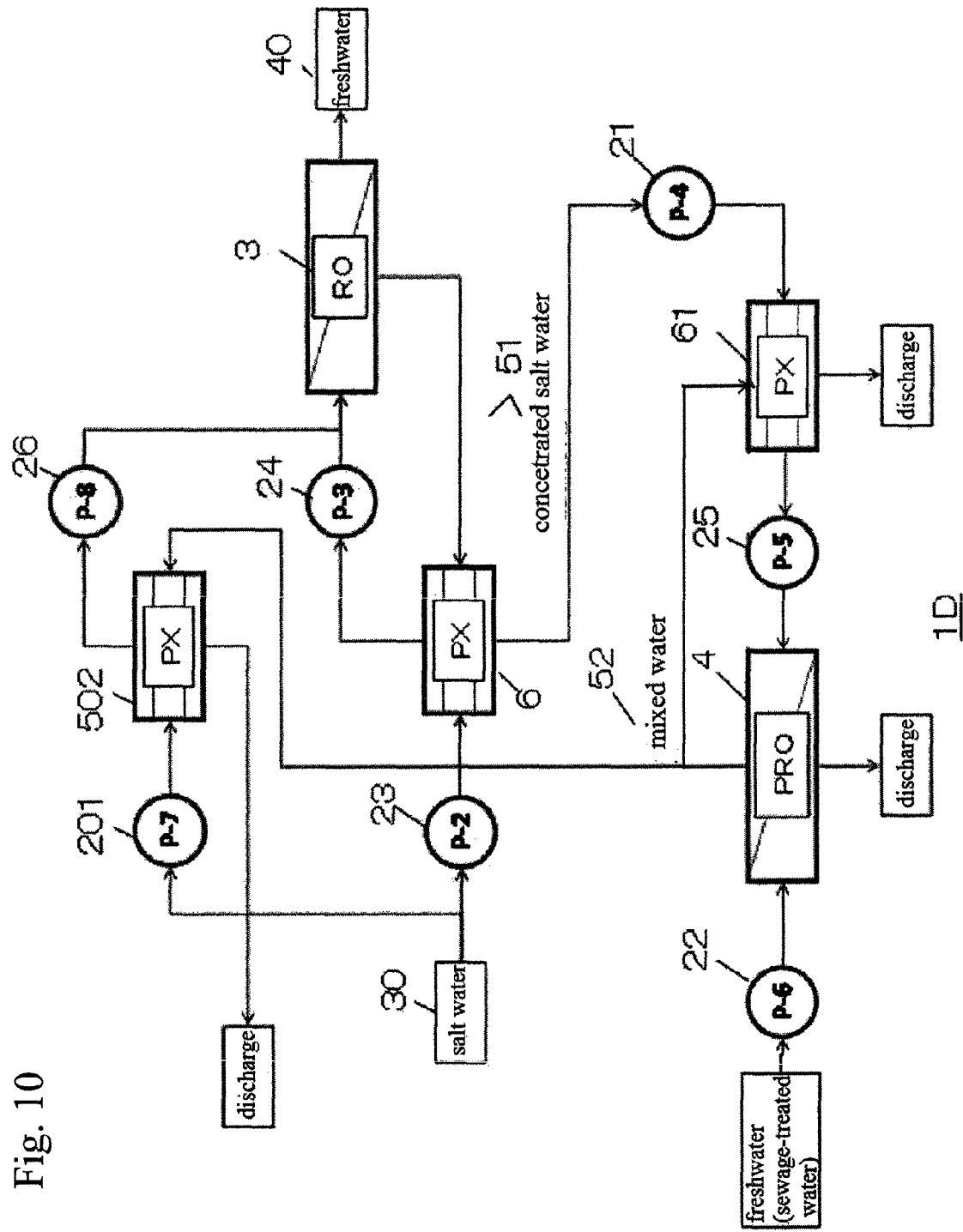
FIG. 10 is a block diagram of a salt water desalination equipment corresponding to variation 4 in the second embodiment of the present invention.

A salt water desalination equipment corresponding to variation 4 will be described below. FIG. 10 is a block diagram of the salt water desalination equipment corresponding to variation 4 in the second embodiment of the present invention. A salt water desalination equipment 1D has the same idea and the same configuration as those in the salt water desalination equipment 1C corresponding to variation 3. For example, on the downstream side of the reverse osmosis membrane component 3, the pressure exchange unit 6 operable to receive the concentrated salt water 51 discharged from the reverse osmosis membrane component 3 is disposed. The pressure exchange unit 6, as explained in the salt water desalination equipment 1B in variation 2 and the salt water desalination equipment 1C in variation 3, by using the pressure of the concentrated salt water 51, the capabilities of the parallel pathways for supplying the salt water 30 are improved.

The concentrated salt water 51 almost losses its pressure by the increase in pressure in the pressure exchange unit 6, but still has a high salt concentration. The concentrated salt water 51 is used in the forward osmosis membrane component 4. At this time, the concentrated salt water 51 is not directly supplied to the forward osmosis membrane component 4, but is supplied through the pressure exchange unit 61 explained in the salt water desalination equipment 1C.

The pressure exchange unit 61 receives a part (having a water volume or a pressure larger/higher than the water volume or the pressure of the concentrated salt water 51 supplied to the forward osmosis membrane component 4) of the mixed water 52 discharged from the forward osmosis membrane component 4 to increase the pressure of the concentrated salt water 51 supplied to the pressure exchange unit 61. When the pressure of the concentrated salt water 51 is increased by the pressure exchange unit 61, the pressure of the concentrated salt water 51 supplied to the forward osmosis membrane component 4 increases. As a result of the increase, the energy of the mixed water 52 in the forward osmosis membrane component 4 increases. More specifically, since the pressure is increased by the pressure exchange unit 61, the forward osmosis membrane component 4 can produce and discharge the mixed water 52 the energy of which is increased.

The salt water desalination equipment 1C in variation 3, the mixed water 52 discharged from the forward osmosis membrane component 4 to the rotation assisting component 501 serving as an assisting device which assists the salt water supply pump 201.

In contrast to this, the salt water desalination equipment 1D in variation 4 shown in FIG. 10 supplies the mixed water 52 discharged from the forward osmosis membrane component 4 to a pressure exchange unit 502 serving as an assisting device. As is apparent from FIG. 10, the pressure exchange unit 502 is disposed on the downstream side of the salt water supply pump 301. The salt water supply pump 201 supplies the salt water 30 to the reverse osmosis membrane component 3. At this time, the salt water 30 having a volume and a pressure which are set depending on the capability of the reverse osmosis membrane phenomenon of the reverse osmosis membrane component 3 must be supplied. For this reason, the salt water supply pump 201 is required to be loaded by the supply performed at the necessary volume and pressure.

In contrast to this, when the pressure exchange unit 502 serving as the assisting device 5 is disposed on the downstream side of the salt water supply pump 201, with respect to the water volume and the pressure of the salt water 30 finally supplied from the salt water supply pump 201 to the reverse osmosis membrane component 3, the pressure exchange component 502 can assist the salt water supply pump 201. The pressure exchange unit 502, by using the mixed water 52 supplied by the forward osmosis membrane component 4, increases the pressure of the salt water 30 flowing from the salt supply pump 201. More specifically, in addition to the increase in pressure in the salt water supply pump 201, the pressure exchange unit 502 can further increases the pressure. In this manner, the pressure increased by the salt water supply pump 201 is further increased by the pressure exchange unit 502, so that the salt water 30 is supplied to the reverse osmosis membrane component 3.

The pressure exchange unit 502 can reduce a load caused by an increase in pressure required in the salt water supply pump 201 in the supply of the salt water 30 through the supply route of the salt water supply pump 201. As a result, the power consumption and the energy consumption of the salt water supply pump 201 can be reduced. The pump 26 compensates for the lack of power by power recovery executed by the pressure exchange unit 502.

In this manner, when the pressure exchange unit 502 is used as the assisting device 5 to make it possible to reduce the power consumption and the energy consumption of the salt water supply unit 2, the power consumption and the energy consumption of which occupy most of the power consumption and the energy consumption in the salt water desalination equipment 1D. With respect to this point, the salt water desalination equipment 1D corresponding to variation 4 can reduce the environmental load. In addition, since the mixed water 52 finally discarded and discharged has a low salt concentration, with respect to this point, the environmental load can be reduced.

(Variation 5)

Figure 11:
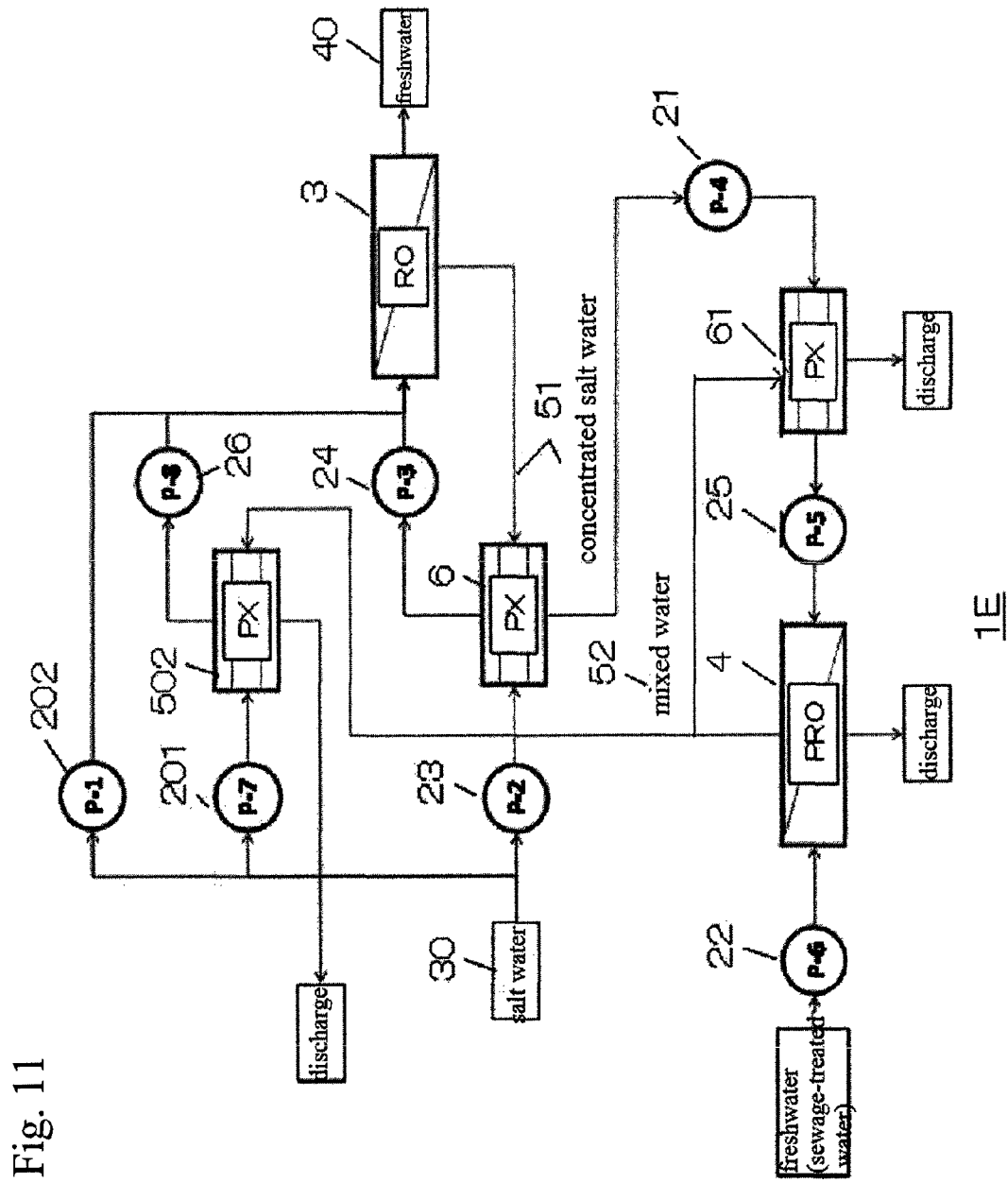
FIG. 11 is a block diagram of a salt water desalination equipment 1 corresponding to variation 5 in the second embodiment of the present invention.

A salt water desalination equipment corresponding to variation 5 will be described below. FIG. 11 is a block diagram of the salt water desalination equipment corresponding to variation 5 in the second embodiment of the present invention. The salt water desalination equipment 1E has a configuration which is almost the same as that of the salt water desalination equipment 1D corresponding to variation 4 described with reference to FIG. 10, a salt water supply pump serving as the salt water supply unit 2 is parallel divided into the salt water supply pump 201 and the salt water supply pump 202. Furthermore, the pump 23 also serves as a part of the salt water supply pump.

On the downstream side of the salt water supply pump 201, as in the salt water desalination equipment 1D, the pressure exchange unit 502 operable to increase a pressure of salt water supplied from the salt water supply pump 201 with the mixed water 52 is disposed. As a result, the load on the salt supply pump 201 decreases.

In addition, since the salt water supply pump 202 is disposed in parallel with the salt water supply pump 201, a load acting when the salt water 30 is supplied from a salt water source to the reverse osmosis membrane component 3 can be divided. As a result, the load on the salt water supply pump 201 decreases. Although the salt water supply unit 2 is totally configured by the salt water supply pump 201 and the salt water supply pump 202, the salt water supply unit 2 is divided to make it possible to make the sum of the power consumptions and the energy consumptions in the two pumps smaller than that in a single pump. Furthermore, in the series of the salt water supply pump 201, the pressure exchange unit 502 using the mixed water 52 can reduce the power consumption and the energy consumption of the salt water supply pump 201 can be reduced.

In this case, the pump 202 makes it easy to control a water volume of salt water flowing into the reverse osmosis membrane component 3. When the salt water supply pump is configured by a single pump, the water volume of the salt water supplied to the reverse osmosis membrane component 3 may be difficult to be controlled. An amount of salt water supplied to the reverse osmosis membrane component 3 is related to an amount of the produced concentrated salt water 51, and an amount of the concentrated salt water 51 is related to an amount of the produced mixed water 52 produced by the forward osmosis membrane component 4 and used in the subsequent assisting device or the like.

The amount of the produced mixed water 52 is related to a balance between amounts of water distributed to the subsequent assisting device, the other pressure exchange unit 61, and the like. When the amounts of distributed water are not balanced, the salt water desalination equipment 1E may be difficult to be designed.

Since the pump 202 is newly disposed to control an amount of salt water supplied to the reverse osmosis membrane component 3, the salt water can be supplied to the reverse osmosis membrane component 3 in consideration of a distribution balance of the mixed water 52 as a whole. The salt water desalination equipment 1E of variation 5 having the above configuration can properly control the entire operation with balance while controlling supply of salt water.

When these operations are correlated with each other, the salt water desalination equipment 1E corresponding to variation 5 can reduce the power consumption and the energy consumption to achieve a reduction in running cost.

Each of the salt water desalination equipments 1A to 1E based on the various variations described in the second embodiment as described above can achieve a reduction in running cost. As a result, the popularization of the salt water desalination equipment can be enhanced.

The salt water desalination equipments explained in the first to second embodiments are examples for explaining the spirit and scope of the present invention, and may be changed and modified without departing from the spirit and scope of the present invention.

REFERENCE SIGNS LIST

1 . . . salt water desalination equipment
2 . . . salt water supply unit
21, 22, 23, 24, 25, 26 . . . pump
201, 202 . . . salt water supply pump
3 . . . reverse osmosis membrane component
4 . . . forward osmosis membrane component
5 . . . assisting device
501 . . . rotation assisting component
502 . . . pressure exchange unit
6 . . . pressure exchange unit
30 . . . salt water
40 . . . freshwater
41 . . . treated freshwater
51 . . . concentrated salt water
52 . . . mixed water
100 . . . salt water desalination equipment
101 . . . salt water
102 . . . freshwater
110 . . . salt water supply unit
120 . . . reverse osmosis membrane component

The invention claimed is:

1. A salt water desalination equipment comprising:
a salt water pump operable to supply salt water to a reverse osmosis membrane component;
a forward osmosis membrane component to which concentrated salt water discharged through another pump from the reverse osmosis membrane component is supplied; and
a rotation assisting component including a bladed wheel to which mixed water discharged from the forward osmosis membrane component is supplied and which is connected to the salt water pump, wherein
the rotation assisting component increases at least one of an electric power supplied to the salt water pump, a pressure given to the salt water pump, and rotation capacity to the salt water pump,
wherein a pressure exchanger is disposed on an upstream side of the forward osmosis membrane component, the pressure exchanger increases a pressure of the supplied concentrated salt water by using the mixed water discharged from the forward osmosis membrane component.

2. The salt water desalination equipment according to claim 1, wherein
the reverse osmosis membrane component has a salt water path to which salt water supplied from the salt water pump is fed and through which the salt water passes and a freshwater path through which freshwater obtained by removing a salt content from the salt water by a reverse osmotic phenomenon on a membrane passes, the concentrated salt water is discharged from the salt water path, and the freshwater is supplied from the freshwater path.

3. The salt water desalination equipment according to claim 1, wherein
the forward osmosis membrane component has a concentrated salt water path to which the concentrated salt water is supplied and through which the concentrated salt water passes and a treated freshwater path to which treated freshwater is supplied and through which the treated freshwater passes,
water molecules move from the treated freshwater path to the concentrated salt water path by a forward osmotic phenomenon, and the forward osmosis membrane component produces mixed water to output the mixed water to the assister.

4. The salt water desalination equipment according to claim 3, wherein
the mixed water has a salt concentration lower than that of the concentrated salt water.

5. The salt water desalination equipment according to claim 3, wherein
the mixed water has at least one of a water volume and an energy larger and higher than those of the concentrated salt water.

6. The salt water desalination equipment according to claim 1, wherein
when the salt water pump is a salt water supply pump which rotates along a rotating shaft to supply salt water,
the rotation assisting component is directly connected to the rotating shaft to increase at least one of a rotating speed and a torque of the salt water supply pump.

7. The salt water desalination equipment according to claim 6, wherein
the rotation assisting component generates rotating force by a pressure of the supplied mixed water to increase at least one of the rotating speed and the torque of the salt water supply pump through the directly connected rotating shaft.

8. The salt water desalination equipment according to claim 1, wherein
when the salt water pump is a salt water supply pump operated by electric power,
the rotation assisting component has an electric power generator operable to generate an assisting electric power supplied to the salt water supply pump, and
the salt water supply pump operates by also using the assisting electric power.

9. The salt water desalination equipment according to claim 8, wherein
the mixed water rotates a turbine included in the electric power generator generating unit with a pressure of the mixed water.

10. The salt water desalination equipment according to claim 1, wherein
the rotation assisting component has a second pressure exchanger operable to be connected to the salt water pump,
the second pressure exchanger receives the mixed water to increase a pressure of the salt water input to the salt water pump, and
the second pressure exchanger supplies the salt water the pressure of which is increased to the reverse osmosis membrane component.

11. The salt water desalination equipment according to claim 1, wherein
the salt water pump operable to supply the salt water from a salt water source to the reverse osmosis membrane component is divided into a plurality of pathways to supply the salt water to the reverse osmosis membrane component,
some of the plurality of pathways have a first pressure exchanger,
the reverse osmosis membrane component supplies the concentrated salt water to the first pressure exchanger,
the first pressure exchanger, on the basis of a pressure included in the concentrated salt water, increases the pressure of the salt water supplied to the reverse osmosis membrane component, and
the first pressure exchanger supplies the concentrated salt water used for an increase in pressure to the forward osmosis membrane component.

* * * * *